US011605255B2

(12) United States Patent
Maclean et al.

(10) Patent No.: US 11,605,255 B2
(45) Date of Patent: Mar. 14, 2023

(54) USER ACTIVITY-RELATED MONITORING SYSTEM AND METHOD, AND A USER ACCESS AUTHORIZATION SYSTEM AND METHOD EMPLOYING SAME

(71) Applicant: NYMI INC., Toronto (CA)

(72) Inventors: Stuart Keith Maclean, Toronto (CA); Abhishek Ranjan, Toronto (CA)

(73) Assignee: NYMI INC., Toronto (CA)

( * ) Notice: Subject to any disclaimer, the term of this patent is extended or adjusted under 35 U.S.C. 154(b) by 42 days.

(21) Appl. No.: 15/931,820

(22) Filed: May 14, 2020

(65) Prior Publication Data

US 2021/0358251 A1 Nov. 18, 2021

(51) Int. Cl.
*G07C 9/37* (2020.01)
*H04W 4/021* (2018.01)
(Continued)

(52) U.S. Cl.
CPC .............. *G07C 9/37* (2020.01); *G06V 20/52* (2022.01); *G06V 40/103* (2022.01); *G06V 40/20* (2022.01); *H04W 4/021* (2013.01)

(58) Field of Classification Search
CPC .. G07C 9/37; G06K 9/00369; G06K 9/00335; G06K 9/00771; H04W 4/021
(Continued)

(56) References Cited

U.S. PATENT DOCUMENTS 5,719,950 A   2/1998 Osten et al.
6,175,641 B1  1/2001 Kallo et al.
(Continued)

FOREIGN PATENT DOCUMENTS

KR   1015781670000 B1   12/2015
WO   2019140528 A1      7/2019
WO   2020082163 A1      4/2020

OTHER PUBLICATIONS

Drahansky, M., "Experiments with Skin Resistance and Temperature for Liveness Detection", Proceedings of the 2008 International Conference on Intelligent Information Hiding and Multimedia Signal Processing, Aug. 15-17, 2008, Harbin, China, pp. 1075-1079, Aug. 15, 2008 (Aug. 15, 2008).
(Continued)

*Primary Examiner* — Ayodeji O Ayotunde
(74) *Attorney, Agent, or Firm* — Knobbe, Martens, Olson & Bear, LLP

(57) ABSTRACT

Described are various embodiments of a user activity-related monitoring system and method, and a user access authorization system and method employing same. In one embodiment, a system is provided for authenticating a user authorised to perform a designated activity in a designated environment. The system comprises a wireless digital user authentication device (UAD) operable to: wirelessly establish an authenticated access session at an access point within the designated environment for performing the designated activity; and acquire activity-related data during performance of the designated activity. The system further comprises a digital application operatively associated with the wireless digital UAD and operable to: digitally compare and evaluate compliance of the activity-related data with a digital authenticated activity template within a designated tolerance.

25 Claims, 16 Drawing Sheets

(51) Int. Cl.
*G06V 20/52* (2022.01)
*G06V 40/20* (2022.01)
*G06V 40/10* (2022.01)

(58) Field of Classification Search
USPC .................................................. 382/115
See application file for complete search history.

(56) References Cited

U.S. PATENT DOCUMENTS

| | | | |
|---|---|---|---|
| 7,378,939 | B2 | 5/2008 | Sengupta et al. |
| 8,045,961 | B2 | 10/2011 | Ayed et al. |
| 8,190,129 | B2 | 5/2012 | Ayed |
| 8,260,262 | B2 | 9/2012 | Ayed |
| 8,498,618 | B2 | 7/2013 | Ayed |
| 8,994,498 | B2 | 3/2015 | Agrafioti et al. |
| 9,032,501 | B1 | 5/2015 | Martin et al. |
| 9,189,901 | B2 | 11/2015 | Agrafioti et al. |
| 9,197,414 | B1 | 11/2015 | Martin et al. |
| 9,349,235 | B2 | 5/2016 | Agrafioti et al. |
| 9,407,634 | B2 | 8/2016 | Martin et al. |
| 9,472,033 | B2 | 10/2016 | Agrafioti et al. |
| 9,646,261 | B2 | 5/2017 | Agrafioti et al. |
| 9,832,020 | B2 | 11/2017 | Martin et al. |
| 2002/0067259 | A1* | 6/2002 | Fufidio .............. G08B 13/183 340/541 |
| 2006/0136744 | A1 | 6/2006 | Lange |
| 2010/0113952 | A1 | 5/2010 | Raguin et al. |
| 2013/0298208 | A1 | 11/2013 | Ayed |
| 2014/0085050 | A1* | 3/2014 | Luna .................. G07C 9/37 340/5.82 |
| 2014/0165185 | A1 | 6/2014 | Lange |
| 2014/0188770 | A1 | 7/2014 | Agrafioti et al. |
| 2015/0074797 | A1 | 3/2015 | Choi et al. |
| 2015/0135310 | A1 | 5/2015 | Lee |
| 2016/0283703 | A1 | 9/2016 | Allyn |
| 2016/0352727 | A1 | 12/2016 | Day et al. |
| 2017/0286661 | A1 | 10/2017 | Sezan et al. |
| 2021/0201318 | A1* | 7/2021 | Wylie ............... G06Q 20/3827 |
| 2022/0101676 | A1* | 3/2022 | Kerzner ............. G07C 9/37 |

OTHER PUBLICATIONS

Hio key: keep your digital life secure by Hio Technologies Inc.—Kickstarter (https://www.kickstarter.com/projects/hiokey/hio-key-keep-your-digital-life-secure), accessed from Internet Apr. 25, 2019.

Ojala, S. et al., "Wearable Authentication Device for Transparent Login in Nomadic Applications Environment", Proceedings of the 2008 Second International Conference on Signals, Circuits and Systems, Nov. 7-9, 2008, Monastir, Tunisia, 6 pages, Nov. 7, 2008 (Nov. 7, 2008).

\* cited by examiner

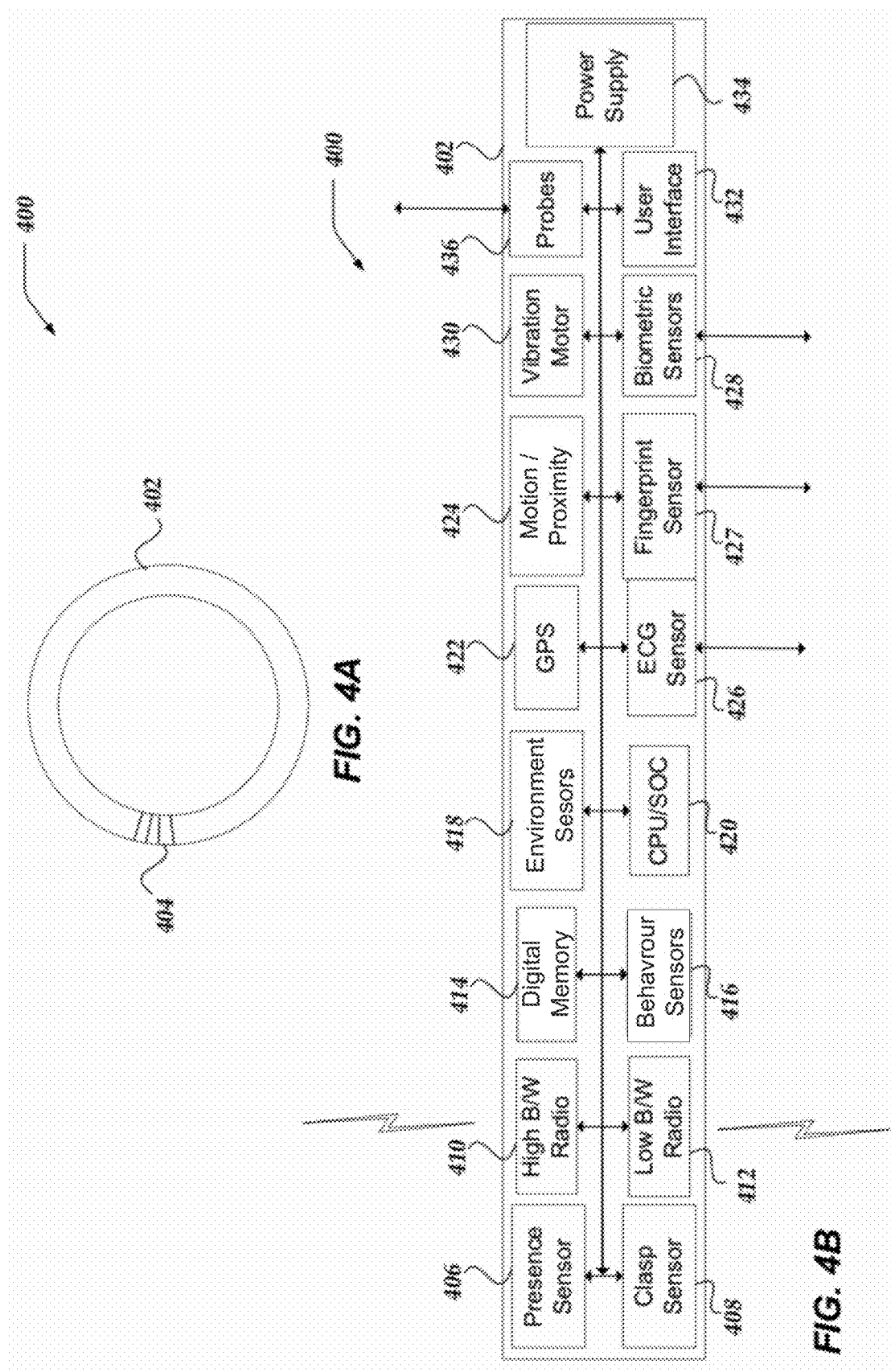

Activity Data

USER ACTIVITY-RELATED MONITORING SYSTEM AND METHOD, AND A USER ACCESS AUTHORIZATION SYSTEM AND METHOD EMPLOYING SAME

FIELD OF THE DISCLOSURE

The present disclosure relates to user access authorization at secure access points, and, in particular, to a user activity-related monitoring system and method, and a user access authorization system and method employing same.

BACKGROUND

As portable devices continue to proliferate among users, manufacturers and service providers are constantly devising new and useful applications for use with a user's portable devices. Further, in some cases, the portable device may serve as a mechanism for identifying the users. For example, in some cases users may employ applications on their smart phones for interacting with point-of-sale stations, where charges for goods and services may be billed directly to their phone service. In other cases, portable devices may be employed to carry and display user credentials such as event tickets, coupons, boarding passes, or the like. However, in these applications there is another user that helps verify or authenticate that the user presenting the portable device to purchase items or verify previous purchases is the correct person. Or, in some cases, if the harm that may be caused by mistaken identity is relatively negligible, it may be taken on faith that the portable device is under the control of the legitimate owner. In other words, the access points may be unable to verify that the user of the portable device is the correct person—the person who is the legitimate owner of the portable device. However, while RFID/NFC tags, such as those in a badge, fob, wristband, or other wearable form factor, are low-cost and readily deployable, such authentication systems may be easily transferable, subjecting the system to the risk of theft by or transfer to an unauthorised user.

Some mobile user authentication solutions now include a wearable device, with additional features and functions that permit not only for the wireless authentication of the user wearing the device, for instance to confirm user presence or again to gain wireless access to a resource associated with a wireless access point, but also in some instances, to enhance confirmation of live user presence during such access or presence detection. International Application Publication No. WO 2019/140528 provides one such example, the entire contents of which are hereby incorporated herein by reference, and in which an authenticated live user presence is confirmed by corroborating a unique user identifier such as a fingerprint with a secondary physiological authentication criterium, such as a verifiable ECG signal.

In U.S. Patent Application Publication No. 2013/0298208, a motion sensor is included for the purposes of restricting access only to a user who is stopping to gain such access, thus seeking to eliminate improper access by a user merely walking by a particular access point.

Once a user has been authenticated, conventional systems remain unlocked or accessible until further action is taken to revoke user access, or again, upon a particular access session time out or upon detecting a connection drop. This, however, may lead to a certain lag time between a user's departure and actual authenticated session termination, presenting a potential security risk.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a user activity and environment monitoring system and method, and a user access authorization system and method employing same that overcome some of the drawbacks of known techniques, or at least, provide a useful alternative thereto. Some aspects of this disclosure provide examples of such processes, systems and methods.

In accordance with one aspect, there is provided a system for authenticating a user authorised to perform a designated activity in a designated environment, the system comprising: a wireless digital user authentication device (UAD) operable to wirelessly establish an authenticated access session at an access point within the designated environment for performing the designated activity and acquire activity-related data during performance of the designated activity, a digital application operatively associated with said wireless digital UAD and operable to digitally compare said activity-related data with a digital authenticated activity template representative of corresponding activity data previously acquired and thus anticipated during performance of the designated activity within the designated environment, automatically evaluate compliance of said activity-related data with said digital authenticated activity template within a designated tolerance, and terminate said authenticated access session upon non-compliance of said activity-related data with said digital user activity template within said designated tolerance.

In some embodiments, the activity-related data comprises intrinsic behavioural data characteristic of the designated activity within the designated environment, and wherein said activity template comprises a stored behavioural template representative of corresponding intrinsic behavioural data previously acquired and thus anticipated during performance of the designated activity within the designated environment, wherein said authenticated access session is terminated upon acquired intrinsic behavioural data being inconsistent with said previously acquired data.

In some embodiments, the behavioural data is representative of one or more of a characteristic motion or gesture, physiological signal, posture, or speech pattern of the user during performance of the designated activity within the designated environment.

In some embodiments, the activity-related data comprises environmental data characteristic of the designated environment.

In some embodiments, the environmental data is representative of one or more of a temperature, a pressure, a humidity, an ambient light, or an ambient sound within the designated environment.

In some embodiments, the environmental data is representative of an ambient radio frequency (RF) signature within the designated environment.

In some embodiments, the ambient RF signature is defined by one or more of a background RF signal, a number of detectable distinct user RF signals, recognisable user RF signal identities, a number of nearby access point RF emitters, recognisable nearby access point RF emitters.

In some embodiments, the digital application and said digital authenticated activity template are securely stored on said UAD.

In some embodiments, the digital authenticated activity template is automatically further updated based on further acquisition of said activity-related data during authenticated performance of the designated activity within the designated environment.

In some embodiments, the digital authenticated activity template is periodically updated while said UAD is inactive.

In some embodiments, the UAD periodically communicates a positive authentication status to said access point during performance of the designated activity within the designated environment so long as said activity-related data complies with said activity template, and otherwise terminates communication of said positive authentication status to terminate said authenticated access session upon non-compliance of said activity-related data with said template within said designated tolerance.

In some embodiments, the UAD communicates a negative authentication status to said access point resulting in termination of said authenticated user access session upon non-compliance of said activity-related data with said template.

In some embodiments, the digital authenticated activity template comprises activity-related data that is specific to a user.

In accordance with another aspect, there is provided an automated method for authenticating a user authorised to perform a designated activity in a designated environment, the method comprising: wirelessly establishing an authenticated access session via a wireless digital user authentication device (UAD) at an access point within the designated environment for performing the designated activity, acquiring, via said UAD, activity-related data during performance of the designated activity, and, via a digital application operatively associated with said wireless digital UAD, digitally comparing said activity-related data with a digital activity template representative of corresponding activity data previously acquired and thus anticipated during performance of the designated activity within the designated environment, automatically evaluating compliance of said activity-related data with said digital authenticated activity template within a designated tolerance, and terminating said authenticated access session upon non-compliance of said activity-related data with said digital user activity template within said designated tolerance.

In some embodiments, the activity-related data comprises intrinsic behavioural data characteristic of the designated activity within the designated environment, and wherein said activity template comprises a stored behavioural template representative of corresponding intrinsic behavioural data previously acquired and thus anticipated during performance of the designated activity within the designated environment, wherein said authenticated access session is terminated upon acquired intrinsic behavioural data being inconsistent with said previously acquired data.

In some embodiments, the behavioural data is representative of one or more of a characteristic motion or gesture, physiological signal, posture, or speech pattern of the user during performance of the designated activity within the designated environment.

In some embodiments, the activity-related data comprises environmental data characteristic of the designated environment.

In some embodiments, the environmental data is representative of one or more of a temperature, a pressure, a humidity, an ambient light, or an ambient sound within the designated environment.

In some embodiments, the environmental data is representative of an ambient radio frequency (RF) signature within the designated environment.

In some embodiments, the ambient RF signature is defined by one or more of a background RF signal, a number of detectable distinct user RF signals, recognisable user RF signal identities, a number of nearby access point RF emitters, recognisable nearby access point RF emitters.

In some embodiments, the digital application and said digital authenticated activity template are securely stored on said UAD.

In some embodiments, the method further comprises automatically updating said digital authenticated activity template based on further acquisition of said activity-related data during authenticated performance of the designated activity within the designated environment.

In some embodiments, the method further comprises periodically updating said digital authenticated activity template while said UAD is inactive.

In some embodiments, the method further comprises the UAD periodically communicating a positive authentication status to said access point during performance of the designated activity within the designated environment so long as said activity-related data complies with said activity template, and otherwise terminating communication of said positive authentication status to terminate said authenticated access session upon non-compliance of said activity-related data with said template within said designated tolerance.

In some embodiments, the method further comprises the UAD communicating a negative authentication status to said access point resulting in termination of said authenticated user access session upon non-compliance of said activity-related data with said template.

In some embodiments, the digital authenticated activity template comprises activity-related data that is specific to a user.

In accordance with another aspect, there is provided a non-transitory computer-readable medium comprising digital instructions to be implemented by one or more digital processors to authenticate a user authorised to perform a designated activity in a designated environment by: wirelessly establishing an authenticated access session via a wireless digital user authentication device (UAD) at an access point within the designated environment for performing the designated activity, acquiring, via said UAD, activity-related data during performance of the designated activity, and, via a digital application operatively associated with said wireless digital UAD, digitally comparing said activity-related data with a digital activity template representative of corresponding activity data previously acquired and thus anticipated during performance of the designated activity within the designated environment, automatically evaluating compliance of said activity-related data with said digital authenticated activity template within a designated tolerance, and terminating said authenticated access session upon non-compliance of said activity-related data with said digital user activity template within said designated tolerance.

In some embodiments, the activity-related data comprises intrinsic behavioural data characteristic of the designated activity within the designated environment, and wherein said activity template comprises a stored behavioural template representative of corresponding intrinsic behavioural data previously acquired and thus anticipated during performance of the designated activity within the designated environment, wherein said authenticated access session is terminated upon acquired intrinsic behavioural data being inconsistent with said previously acquired data.

In some embodiments, the behavioural data is representative of one or more of a characteristic motion or gesture, physiological signal, posture, or speech pattern of the user during performance of the designated activity within the designated environment.

In some embodiments, the activity-related data comprises environmental data characteristic of the designated environment.

In some embodiments, the environmental data is representative of one or more of a temperature, a pressure, a humidity, an ambient light, or an ambient sound within the designated environment.

In some embodiments, the environmental data is representative of an ambient radio frequency (RF) signature within the designated environment.

In some embodiments, the ambient RF signature is defined by one or more of a background RF signal, a number of detectable distinct user RF signals, recognisable user RF signal identities, a number of nearby access point RF emitters, recognisable nearby access point RF emitters.

In some embodiments, the digital application and said digital authenticated activity template are securely stored on said UAD.

In some embodiments, the non-transitory computer-readable medium is further operable to automatically update said digital authenticated activity template based on further acquisition of said activity-related data during authenticated performance of the designated activity within the designated environment.

In some embodiments, the non-transitory computer-readable medium is further operable to periodically update said digital authenticated activity template while said UAD is inactive.

In some embodiments, the non-transitory computer-readable medium is further operable to periodically communicate via said UAD a positive authentication status to said access point during performance of the designated activity within the designated environment so long as said activity-related data complies with said activity template, and otherwise terminating communication of said positive authentication status to terminate said authenticated access session upon non-compliance of said activity-related data with said template within said designated tolerance.

In some embodiments, the non-transitory computer-readable medium is further operable to communicate via said UAD a negative authentication status to said access point resulting in termination of said authenticated user access session upon non-compliance of said activity-related data with said template.

In some embodiments, the digital authenticated activity template comprises activity-related data that is specific to a user.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 4A and FIG. 4B are schematic physical and logical diagrams, respectively, of a wearable user authentication/access authorization device, in accordance with at least one of the various embodiments;

Figure 1:
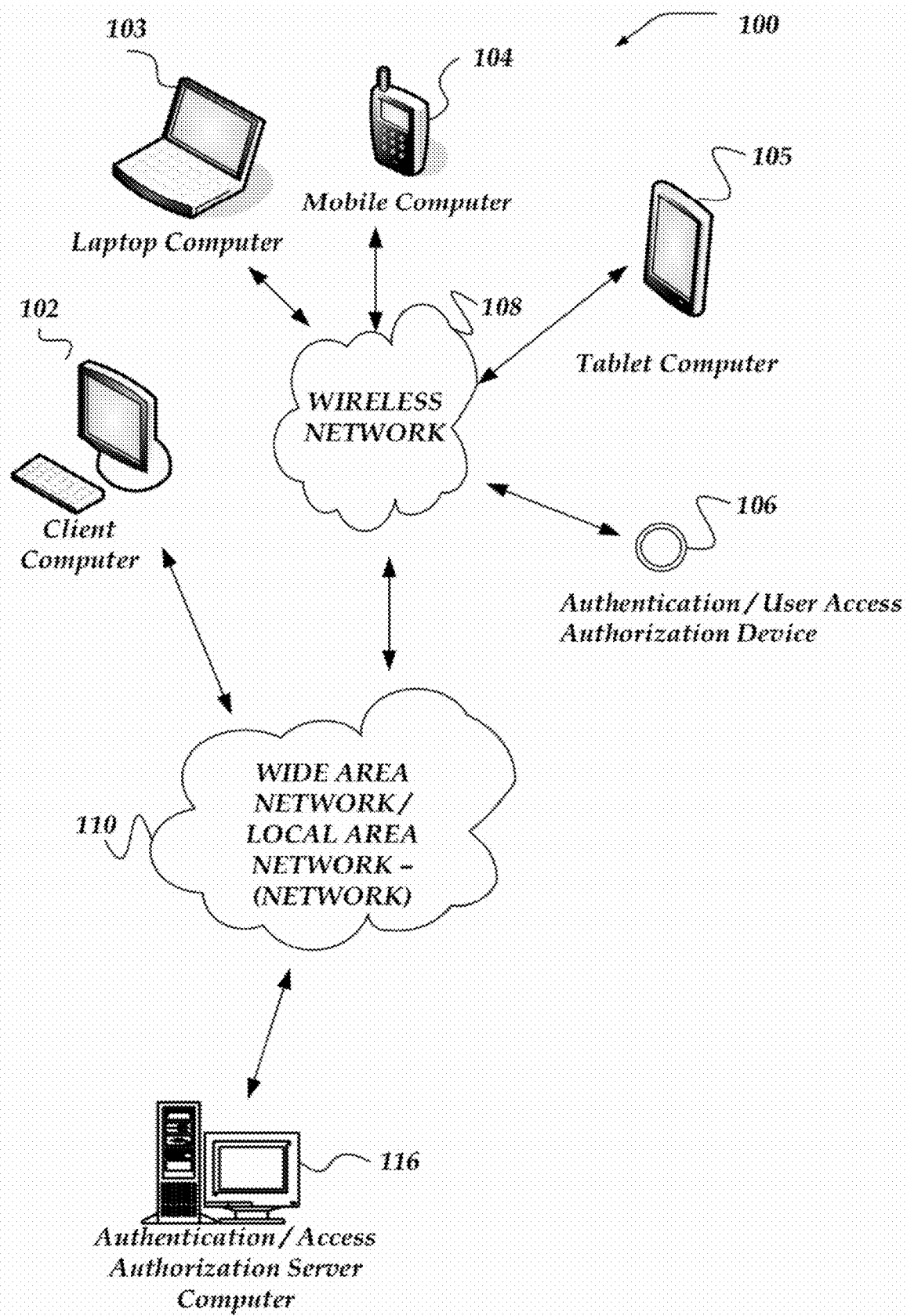
FIG. 1 is a component diagram for an environment in which some embodiments of the disclosure may be practiced.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this disclosure belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The terms "physiological," "physiological data," or "physiological signal" as used herein are understood to mean any signal that can be obtained via a sensor or device when operatively interfacing with a user to confirm a live user presence. Non-limiting examples of physiological signals are heart rate, galvanic skin response, temperature, electrocardiogram (ECG), photoplethysmogram (PPG), electromyogram, electroencephalogram, transient otoacoustic emissions, phonocardiogram, perspiration, or the like, or a combination thereof. A live user presence can also be confirmed using any combination of the above or other physiological parameters, as can other physiological signals and/or sensors be considered alone or in combination to produce this result.

The terms "biometric," "biometric data," or "biometric signal" as used herein are understood to mean any signal that can be obtained from a user that can uniquely identify the user, including, but not limited to, one or more unique physiological signals or signatures that can be processed to uniquely identifier the user. Non-limiting examples of biometric signals are gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram (ECG), photoplethysmogram (PPG), electromyogram, electroencephalogram, transient otoacoustic emissions, phonocardiogram, DNA, one or more chemical markers, one or more biochemical markers, skin-based pattern, colour variation or discolouration, perspiration, or a combination thereof. A unique identity of a user can also be obtained by observing patterns or combinations of one or more biometric characteristic. For example, a person may have a unique heart rate at a particular temperature and with a particular amount of sweat. In this way, two or more biometric observations can be combined or fused to obtain a multi-modal unique biometric profile. This is especially useful in situations wherein one particular biometric is not sufficient as a standalone identifier. In one example, perspiration and gait can be combined or fused to provide a unique biometric profile for a user. Information from sources that are standalone identifiers can also be combined in order to increase accuracy and/or security. In another example, a multi-modal biometric system may fuse fingerprints with iris and face characteristics.

The terms "access point" and "resource" are used interchangeably herein refer to any logical or physical gateway, device, or application that requires authentication, such as for security or personalization purposes, and is otherwise locked or inaccessible to the user. Some non-limiting examples of physical access points are electronically locked doors, parking transceivers, smart environment technologies, vehicle doors and transit systems. Some non-limiting examples of logical access points are password, PIN, passcode or otherwise digitally protected electronic devices (e.g. smartphone, desktop computer, laptop, tablet, workstation, onboard vehicular device, etc.) or accounts, proof of payment systems, point of sale stations, automated bank teller machines, library checkout systems, and hotel and airport check-in stations. Further, access points may be considered a generic term for applications, computers, terminals, devices, or the like, that are enabled to communicate using the protocols described herein. For example, a wireless access point may be operatively associated with a network application to identify, monitor or track an authenticated user presence without necessarily invoking a further action in response to such recognized user presence. Namely, while some embodiments may encompass an access point for the purposes of authenticating a user presence in order to grant the user authenticated access to a particular resource, user presence authentication may not be limited to such applications, but may also include embodiments where a user's authenticated presence is recognized, monitored and/or tracked for other purposes, such as for advertising, analyzing user traffic and/or usage of designated physical spaces, law enforcement, etc. For simplicity, the terms "access point" and "resource" will be used interchangeably herein to refer not only to the computational device or application (e.g. physical hardware, firmware and/or software application) being accessed and operated to implement or provide for user presence authentication and/or access authorizations, but also any one or more resources that are operatively associated therewith, whereby a resources may include, but is not limited to: a physical space, room, zone or area contained or otherwise restricted by an electronically controlled gateway, door, gate or entryway; physical or computational workstation, device, equipment and/or tool for manufacturing, testing, verification, simulation, development, research, experimentation, development, assembly, etc.; physical or digital library, directory, repository and/or other classified or restricted information repository; and/or the like.

The term "access control signal" as used herein refers to a signal sent by an access control device, such as a user authentication device (UAD), to a physical or logical access point and/or resource that may enable the user to unlock, interface and/or access the access point/resource. The control signal may be a binary encoded sequence or user identifier transmitted wired or wirelessly using but not limited to Bluetooth (e.g. BLE), near field communication, ultra-wide band, RFID, or WiFi. The control signal may include, represent or correspond with a biometric, non-biometric, physiological and/or non-physiological signal depending on the application and/or context at hand.

The term "finger" as used herein refers to any digit attached to a hand or foot, including a thumb or a toe.

The term "encryption" as used herein is understood to refer to actions that change (information) from one form to another to hide its meaning. Further, in some embodiments, encryption as used herein may include employing pseudorandom transformations that produce pseudorandom outputs in the sense that a cipher text may be distinguishable from a completely random sequence of bits of the same length without revealing anything about the plaintext. For example, consider adding one or more zeros at the end of every encryption output. In at least one of the various embodiments, encryption may include applying pseudorandom function information, where the key of the pseudorandom function may be stored locally on a mobile device.

The terms "authorized authentication device" and "user authentication device" as used herein refer to devices and/or access points that may be arranged to include specialized applications for enrolling/registering a mobile device with a user. Authorized authentication devices (AADs) may be arranged to store keys, encrypted biometric user profiles, or the like. In some embodiments, implementation of at least some of the AAD functionality may be incorporated and/or otherwise embedded within the functions of a portable device, such as embedded within a wearable authentication/user access authorization device or the like, and/or distributed between such portable/wearable devices and/or one or more network-accessible servers, client computers, access points or the like. In some of the examples provided herein, a user authentication device or "UAD" is defined as a portable or wearable device operable to execute onboard user authentication procedures to thereby activate the UAD to broadcast or otherwise communicate or distribute an authenticated user status or identity, and/or activity-, motion-, behaviour-, environment- and/or ranging-related data for implementing/processing authenticated user presence or access privileges with one or more access points/resources.

The terms "motion-related data" or "motion-related sensor", and "proximity or ranging-related data" or "proximity or ranging-related sensor" as used herein refer to any data/sensor that may be used to infer motion or range/proximity, respectively. For example, while a motion-related sensor may readily output data directly related to motion, sequential position data output from a GPS sensor may also be used to derive motion data. Furthermore, sensors capturing physiological signals may also be used to infer motion. For example, an electrocardiogram (ECG) or photoplethysmogram (PPG) sensor can determine heart rate changes indicating the extent or intensity of motion. Accordingly, motion-related sensors can support user presence and proximity functions and features, as described further below for example, in tracking a user presence status (e.g. arriving, present, departing) and automatically recognizing an intended departure to automatically initiate and/or support authorized access termination. Accordingly, motion-related sensors for acquiring motion-related data may include, but are not limited to, an accelerometer, a motion sensor, a step counter, a proximity sensor, a (near) IR sensor, a GPS, a gyroscope, capacitive sensors, a radio fingerprint, and/or the like. Conversely, one or more ranging-related (proximity) sensors may be used, for example, to complement motion-related data in wirelessly capturing a range between communicating devices. Such sensors may include, but are not limited to, sensors and/or systems for acquiring or automatically evaluating a wireless signal strength, time-of-flight, or the like.

The term "activity-related data" as used herein is understood to refer to one or more measurable behavioural or environmental characteristics that may be identified as consistent with an authorised activity. An authorised activity may comprise, but is not limited to, one that is performed by an authorised user, or is performed in a designated environment(s). For instance, activities of interest may include those that may be performed in controlled workplaces. In accordance with various embodiments, activity-related data may include, but are not limited to, behavioural characteristics of one or more users that may be differentiable from, for instance, those of the one or more users performing a different activity, or those of an unauthorised user performing the designated or another activity. Similarly, activity-related data may, alternatively or additionally, refer to environmental parameters related to designated areas that may, at least in part, be used to confirm that an environment is consistent with one that is authorised for a designated activity.

Activity-related data may, in accordance with various embodiments, be used to varying degrees in confirming the performance of an activity, or identifying the performance of an unauthorised activity. For instance, in some embodiments, a single activity-related datum may authenticate an activity. In other embodiments, a designated set of activity-related data may be required to be met in order to authenticate an activity. In yet other embodiments, if a designated number of activity-related criteria are indicative of an unauthorised activity, a termination of an authenticated session may be initiated, or an authenticated session may not be allowed to begin. Furthermore, activity-related data may be user-agnostic in that a user need not be specifically identified in order to authorise an activity (i.e. data is related to the activity itself, rather than the user), or may, to varying degrees, be user-specific. The terms "behavioural characteristics", "behaviour-related data", "behavioural data", and "behavioural features" as used interchangeably herein may refer to intrinsic properties that may be measured and identified as consistent with a user performing a designated activity. Properties that may be intrinsic to a user may include, but are not limited to, one or more of a gait, motion-related data, motion pattern, height, voice, speech or sound pattern, range of motion, speed, and the like, and may comprise a physiological or biometric signal or characteristic. In accordance with various embodiments, a behavioural characteristic may not necessarily be used to identify a user, but rather may be related to any user performing a designated activity. For instance, an authorised activity may require a particular level of physical exertion. Activity-related data may therefore comprise the behavioural characteristic of a heart rate, wherein an elevated heart rate is indicative of the authorised activity. In accordance with various embodiments, a behavioural activity-related datum, such as a heart rate, may serve as a criterium for, at least in part, authenticating an activity for any number of unidentified users. In other embodiments, such behavioural activity-related data may be used to at least partially authenticate a particular user performing the designated activity. For instance, an authorised user may be in excellent physical condition, and may perform a physically demanding activity while exhibiting a low-to-moderate heart rate. As such, detection of a highly elevated heart rate may be indicative that the activity is not being performed by the authorised user. A behavioural feature may also include a unique motion profile, such as one that is indicative of constrained motion, as would be observed if, for instance, a user was wearing protective clothing (e.g. gowns, boots, cloves). Throughout the disclosure, it is understood that the term "behaviour" may, depending on context, also be linked to an environment and/or environmental characteristic.

The terms "environmental characteristics", "environment-related data", "environmental data", "environmental parameters", and "environmental features" as used interchangeably herein may refer to extrinsic properties that may be identified as consistent with a designated environment and/or workplace in which an authorised activity may be performed. Non-limiting examples of such environmental data may include, but are not limited to, the presence of one or more, or a specific combination of, devices that may be detected wirelessly and/or the signal strengths thereof, environmental conditions such as temperature, pressure, humidity, RF signals, RF signal patterns and/or stability, ambient light or sound profiles, a number of people or users in a particular environment, identities of people or users in an environment, environment size or geometry, or the like.

The terms "template", "activity template", "profile", or "user profile", as used herein, may refer to, in addition to meanings known in the art, one or more data, a dataset, or a data subset to which either raw or processed activity-related data may be compared or matched against to at least partially identify an activity. In various contexts and/or embodiments, such partial identification of an activity may also include identification that one or more of such activity-related data do not correspond to an authorised activity. A template may, in accordance with various embodiments, range in user specificity from complete user-agnosticism (i.e. a template may correspond only to activity-related metrics), to a user identification within a designated margin of error, or again include complementary user-identifying data such as physiological and/or biometric data or profiles concurrently or complementarily used for user-specific identification, authentication or confirmation.

Various embodiments of this disclosure relate, at least in part, to an authentication method, device, and/or system, for example, for authenticating a user authorised to perform a designated activity, for instance, in a designated environment. As will be described in greater detail below, embodiments as described herein may be applied in different context or environments, and to achieve different purposes in respect of authenticating the performance of a particularly activity or task, for instance, in enhancing security or accountability for a related process, data integrity, or product manufacturing or assembly, to name a few examples.

For example, data integrity is paramount for secure manufacturing industries (e.g. pharmaceuticals, medical equipment, and chemical labs) not only because of traceability in case of accidents or recalls, but also to maintain efficient functioning of the facility. Regulatory bodies (e.g. FDA) prescribe that with every finished product there must be an associated record of all the processes and operators that interacted with it. Unsurprisingly, the pharmaceuticals industry alone spends hundreds of millions of dollars to manage this process. Naturally, other secure and/or controlled environments or processes may benefit from such security, traceability and monitoring practices.

At the core of data integrity is user access control. A system controlling the manufacturing process, such as a manufacturing execution system (MES), may place many provisions to ensure that, for instance, authorized users can perform a sensitive task, non-limiting examples may include, but are not limited to, entering a clean room, mixing a chemical to a drug, accessing device control, and the like. In typical use cases, a user may authenticate prior to performing a task by, for instance, entering a PIN/password, tapping an RFID/NFC key, or presenting a fingerprint or other biometric at the access point.

Depending on the activities at a given facility, a user may have to authenticate hundreds of times every day, so the cost of total time users spend in typing PINs and/or passwords may be prohibitively high. Furthermore, this may also lead to users selecting simpler/shorter passwords, which may compromise or damage system security.

Low-cost RFID/NFC tags, such as those in a badge, fob, wristband, or other wearable form factors, may be more efficient and readily deployable. However, such a platform may have the drawback of being easily transferrable. For instance, an impostor may steal the badge and gain authorization by tapping at a reader, or an authorized user may collude with an unauthorized user and willingly pass the badge.

Biometrics-based access control, which typically rely on fingerprint analysis, may address these abovementioned issues. For example, in many facilities, a fingerprint sensor is placed beside a door or control panel, and a user is required to present a fingerprint to obtain authorisation. On one hand, such systems make it difficult for an impostor to access a resource. On the other hand, in a case of collusion, it forces an authorized user to be present at all access points with the colluder, increasing the difficulty of such a security attack, potentially rendering it impractical.

Deploying such biometrics security systems on a wide scale, however, may have inherent drawbacks, such as the staggering costs of deploying such systems at all access points, or the privacy risks involved in creating a central repository of biometrics of all the employees in a facility. Furthermore, in clean room environments in which users wear gloves and masks, such biometric authentication requirements may simply be infeasible. These issues prevent most large establishments from using a biometrics-based security solution, and rely instead on PINS, passwords, or RFID/NFC tags as prevalent modes of user authentication.

Various embodiments of this disclosure relate, at least in part, to an authentication method, device, and system, alternatively referred to herein as BehaveID, that may in some aspects combine the deployability of NFC/RFID tags with the security of biometrics, while preserving privacy. In various embodiments of the disclosure, a method, device, or system as described herein may build upon prior research in gait and activity recognition using motion sensors, and may have the capability of satisfying various criteria of relevance to user authentication with a wearable device. Among other aspects, such criteria may include, but are not limited to, a wearable device that may be: difficult to transfer (C1), privacy preserving (C2), and/or highly secure (C3).

In accordance with various embodiments, any one or more of C1 to C3 may be preserved. For instance, a wearable may be difficult to transfer in that it provides continuous and/or seamless authentication of a user. It may also be privacy-preserving in that a wearable may restrict biometric and/or activity data to the device itself, and not transmit or transfer such private data outside of the wearable. It may also provide security in that an activity profile may be created, in accordance with some embodiments, on the device and/or another logically connected system, using behavioural and/or environmental characteristics consistent with authorized performance of a designated activity or activities, and/or within a designated environment. In accordance with various embodiments, such profiles may be periodically or continuously updated or improved as activity is monitored, providing a potential avenue for increasing system security.

While fingerprint-based authentication has been widely implemented on low-power embedded device, examples of which include Nymiband and YubikeyBio, it does not facilitate continuous and seamless authentication, and thus fails to satisfy C1. Similarly, while gait- and activity-recognition-based continuous authentication systems have been proposed for mobile devices (for instance, DEB, D., et al., "Actions Speak Louder than (Pass)words: Passive Authentication of Smartphone Users Via Deep Temporal Features", ICB, 2019, and KWAPISZ, J. R., et al., "Cell Phone-Based Biometric Identification", Fourth IEEE International Conference on Biometrics, Theory, Applications and Systems, 2010), this has not been implemented on wearable devices. Such systems primarily utilize user motion data, limiting scope and accuracy, and thus fail to satisfy C3. Conversely, more comprehensive behavioral biometrics-based systems, primarily target use cases involving fraud prevention in online transactions, have recently gained prominence owing to the large amount of user data, powerful server infrastructure, and recent advances in neural networks (e.g. BehavioSec, Twosense). Such systems store rich user data in a cloud, create biometric templates, and perform authentication in the cloud or on a mobile device (PATEL, V. M., et al., "Continuous User Authentication on Mobile Devices: Recent Progress and Remaining Challenges", IEEE Signal Processing Magazine, Volume 3, No. 4, 2016). However, such systems sacrifice privacy for continuous, real-time user authentication, and thus fail to satisfy C2.

In comparison, BehaveID, in accordance with various embodiments, may uniquely identify a user by recognizing a range of activity, physiological and/or behavioural characteristics and/or environmental characteristics around a user. In some embodiments, this may be done entirely on a wearable device, without storing or transferring any data outside of the wearable device. It may gather data on the device, extract certain specific features, create a user profile over a certain period of time, and/or store the profile on the device.

In accordance with some embodiments, BehaveID may achieve one or more of C1 to C3 as described above by storing a range of user and/or environmental data and/or corresponding extracted features, and processing the data either in real-time or retrospectively when on-device resources are available (e.g. at end-of-day, when charging). Such a system may be desirable in environments with strict compliance requirements, high privacy standards, and/or relaxed real-time authentication requirements. The following briefly describes various embodiments in order to provide a basic understanding of some aspects of the herein described technology. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards communicating using a mobile device, such as a mobile or wearable user authentication and user presence and/or access authorization device in a secured environment. Co-pending Canadian Patent Application No. 2,992,333 for a User Access Authorization System and Method, and Physiological User Sensor and Authentication Device Therefor, U.S. Pat. No. 9,197,414 for a Cryptographic Protocol for Portable Devices, co-pending Canadian Patent Application No. 3,022,117 for a Cryptographic Process for Portable Devices, and User Presence and/or Access Authorization System and Method Employing Same, co-pending Canadian Patent Application No. 3,042,361 for a Live User Authentication Device, System and Method and Fraud or Collusion Prevention Using Same, and U.S. patent application Ser. No. 16/663,781 for a User State Monitoring System and Method Using Motion, and a User Access Authorization System and Method Employing Same, the entire contents of each of which are hereby incorporated herein by reference, provide illustrative environments and contexts for implementation of the herein described embodiments, and complementary technologies that may, optionally, be used in concert with the embodiments described herein.

As will be described in greater detail below, systems, devices and methods as described herein may comprise and/or invoke an access control system, subsystem or process whereby a user's activity and environment can be monitored to authenticate and/or corroborate an authentication of a user in an environment where access is to be controlled or limited to specific users and/or activities. Examples of such environments may include, but are not limited to, a workplace or an access point, also herein referred to interchangeably as an endpoint, where access restrictions apply. For example, an administrator of such an access control system may wish to grant only to a user or users with enough privilege access to, for instance, a computer, software, workstation or physical door, gateway or workspace. In a system where an access session is initiated during or after authentication, such as at system sign-on or login, or again during or after a user enrolment process as may be applicable in a given implementation, the confirmed identity and/or appropriate activity of a user at the endpoint through active monitoring of user activity, behaviour and/or environment may provide an additional level of assurance that the correct user is present beyond initial authentication. For instance, user enrolment at the access point may be initiated upon user arrival, either automatically via automatic mobile/endpoint detection and/or in response to a user enrolment action, and a user access session maintained in so long as the user identity and/or activity is confirmed at or near the end point. In some embodiments, where activity-related data indicates a change in user identity or activity, or a departure from an endpoint, authorized access may be automatically terminated. In this respect, a user access authorization may be terminated immediately upon departure from an authorised activity, thus minimizing any persisting access authorization lag that may otherwise apply in systems requiring an active logout, invoking an access authorization timeout due to inactivity, or again where access termination is otherwise invoked due to a loss of signal from the user's authentication device.

It will be appreciated by the skilled artisan from the following description of exemplary embodiments that different user access authorization scenarios may be applied within the present context, without departing from the general scope and nature of the present disclosure, that may involve authenticated access to different access point resources and/or authenticated user activity, presence tracking, monitoring and/or logging and thus, invoke different prescribed user access or presence session timelines, restrictions and/or privileges.

In some embodiments, a logical or physical access system may comprise a set of endpoints (access points) where users may request access. Each endpoint may be equipped with one or more communication devices, such as short-range radio transceivers, that use proprietary or standard protocols that may include, but are not limited to, Bluetooth Classic, Bluetooth LE, Ultra-Wideband, Wi-Fi, and the like, and are capable of receiving inputs, and performing computation and bi-directional communication. Endpoints may also comprise a notification system as part of its interface, examples of which may include, but are not limited to, a graphical display, LED(s), haptic feedback and the like. As further described below, access points may be operatively associated with different user access or presence resources such that user access to such resources is only authorized upon maintained authenticated user identity and/or activity.

Some of the embodiments described herein provide for a wearable user authentication device (UAD) capable of bi-directional communication and authenticating the identity of a live user, and may also comprise any number of the endpoint features described. UADs considered herein may also comprise at least one sensor capable of detecting motion through the acquisition of motion-related data. Such a sensor may comprise, but is not limited to, one or more of an inertial measurement unit (IMU), a global positioning system (GPS), an accelerometer, a step counter, a magnetometer, or the like. In some embodiments, ranging-related (proximity) data, an example of which may be distance to various wirelessly accessible devices, may also be acquired to aid in confirming environment and/or user activity.

In some embodiments, upon successful identification and authentication at a given access point using, for example, credentials like a password, biometric, mobile device or a security token, the user may be granted access to an access point or related resource, thereby initiating an authenticated user access session at the access point. This session may be limited to a prescribed amount of time or again maintained indeterminately in so long as the user's authenticated presence, identity, behaviour, activity, or environment can be confirmed. In either case, and in accordance with some embodiments, the UAD may periodically communicate appropriate session access credentials (e.g. authenticated user ID, secure active session access token, short-term advertising key, etc.) with the access point so to maintain the active session, in the absence of which the session may be terminated. In some of the herein described embodiments, activity-related data may also be periodically communicated as part of, or distinctly from, the session access credentials, so to reflect a current user presence, identity, or environment state based on this activity-related data, wherein the capture of activity-related data not representative of an authenticated user identity or environment can result in automatic termination of the active session. As detailed below, activity-related data can be captured by the UAD and communicated, in various forms, to the access point for processing by a (network) application operatively associated with the access point in governing user access, e.g. whereby receipt of raw or processed activity-related data not representative of an authenticated user behaviour may result in termination of user access. As will be appreciated by the skilled artisan, processing resources for processing activity-related data may be applied at either or both the UAD and access point depending on the application at hand.

In some embodiments, activity-related data are provided to comprise or complement authentication data otherwise captured via conventional authentication mechanisms (e.g. a biometric signature, proximity- or motion-related data, or the like). For example, conventional mechanisms to detect and communicate presence of a wearable device to an endpoint may involve performing a range estimation between a pair of radio devices. For example, if the range between devices is determined to be below a certain distance, the user and/or device is considered to be present in the region of the endpoint. However, such estimations typically rely on radio signal properties like attenuation of radio signal power, signal time-of-flight, or phase change of the signal. Such properties often suffer from signal fading due to multi-path propagation or shadowing from obstacles, which can lead to inaccurate range estimates. These issues are exacerbated in wearable devices, as the associated radio transceivers are continuously moving and can be obstructed by the wearer's body. This can lead to a frustrating user experience, as ranging errors can lead to incorrectly limiting or denying access to a user. There is therefore a need to replace, enhance, or complement such presence detection schemes to improve the usability and functionality of access control systems.

Various embodiments of the present disclosure perform such replacements, enhancements or complements to presence detection schemes by estimating the state of the user (i.e. arriving at, present at, or departing from an endpoint) through the acquisition and processing of activity-related data from one or more wearable sensors. In accordance with at least one embodiment, activity data, such as range or extent of motion, gait, motion pattern, and the like, may be employed to corroborate decisions pertaining to, for instance, a user departure, contributing to the mitigation of such ranging-estimation issues.

In another embodiment, a motion sensor such as an IMU can be used to estimate the extent of user motion, with readings complemented by data acquired by another sensor, such as a PPG. In such an example, the user's heart rate may be used to corroborate the extent of user motion as estimated by the IMU, in the event that spurious movements of the wearable sensor may lead to inaccurate determination of the extent of motion. Such activity measurements may, additionally or alternatively, contribute to and/or be used to determine a corresponding user activity profile for user authentication.

In yet other embodiments, ranging estimates may also be performed to complement activity or behaviour data acquired by one or more sensors to estimate the state of the user and/or wearable device. Such raw or processed data may additionally be fused together in data packets exchanged by the various devices to estimate the identity or state of the wearable device and/or user. While some embodiments may utilise absolute measurements of sensor data, some may, alternatively or in addition thereto, perform estimations of user behaviour based on such measurements relative to an endpoint.

In accordance with some embodiments, an activity identification scheme may comprise data related to radio signals detected by a wearable device and/or an endpoint. In some contexts related to this disclosure, a wearable device may be deployed in environments with many transmitting radios on board endpoint and other infrastructure devices, wherein such signal transmissions may be received by a wearable device. As received signal data may change with the location of the wearable device due to its relative distance to transmitting infrastructure devices, said signal data may be employed in location and/or environmental estimation techniques. This principle is, at least in part, the basis for a location estimation technique referred to herein as radio fingerprinting.

Implementation of a radio fingerprinting technique can involve training to map radio signal measurement data to locations. However, when applied to an activity detection scheme, in accordance with some embodiments of the present disclosure, such training may not be required, as the presence of the wearable device may be simply due to a relative distance and/or change thereof upon motion to an endpoint. Movement of a user in possession of a wearable device may change the set of radio data acquired, from which user activity may then be inferred. Such data may comprise motion profile data communicated to establish an activity, and/or complement other motion and/or proximity data captured from, for instance, an IMU or a physiological sensor. For example, and in accordance with at least one embodiment, a disappearance of one or more radio devices and an appearance of a new set of radio devices present in the vicinity of a wearable device, as determined by received radio data or radio range data, may indicate that the wearable device, and hence a user, is in motion. Radio data may therefore, in accordance with some embodiments, comprise information related to user activity, which may be analysed to determine whether a user is behaving in a manner that merits authentication for a particular resource, whereby access can be granted or denied accordingly.

Some embodiments of this disclosure may involve an enrolment step or protocol before and/or during the exchange of activity data between a UAD and an endpoint. Such an enrolment, while not necessarily required for the processes and systems herein described, may in theory or in practice involve an association between the UAD and the endpoint wherein their respective identities and any required data for security are shared. Once association is established, communication between the wearable and the endpoint may be cryptographically secured. Such association may also be time-limited, whereby the endpoint and wearable devices forget each other's identity after a prescribed period. Such enrolment processes may also ensure that only one or more authorised endpoints or UADs can decipher presence information broadcast by another device.

In general, embodiments herein described will often comprise the estimation of a user activity from acquired data. The sensitivity of such estimations may be adjusted by a user or system administrator to make it more or less restrictive, depending on the use case. For example, the relative weight of motion-related data such as a gait determination acquired from a motion sensor may be increased or reduced relative to that of a proximity-related measurement such as a range to a specific wireless terminal to reduce an error rate in a user activity determination for a particular user, role, or activity, within a particular context.

In at least one embodiment of the present disclosure, a verifiable signal may be transmitted between at least one of the UAD, the endpoint, or an external device in the form of a continuous radio transmission of data packets which encodes the identity of the wearable device, the identity of the endpoint, and the presence state of the UAD. This signal could be used by an application on at least one of the UAD, endpoint or external device to confirm, for instance, the presence of the user at the endpoint. Such verifiable signals could be achieved, for instance, with standard symmetric or asymmetric cryptographic techniques and/or timestamps (e.g. as further described below) to, for instance, mitigate replay.

Activity monitoring or tracking may be implemented in many ways. For instance, the UAD and endpoint may collaborate. As an exemplary embodiment of collaborative monitoring, the user of a wearable or an endpoint device may initiate an activity tracking session on the UAD. The UAD may subsequently transmit sequences of data packets to the endpoint. The time between such transmissions may optionally be subject to a maximum prescribed time T that may not be exceeded.

In other similar embodiments, data packets may be exchanged from the endpoint to the UAD, from one or more of the UAD and the endpoint to an external device, or from any one or more of the UAD, endpoint, or external device to any other device operatively connected to, either physically or wirelessly, another component of the system.

Various embodiments may also allow for the UAD to terminate the transmission of wireless signals to improve battery life and/or offer the possibility of enhancing privacy or security, for instance, through limiting exposure to relay attacks.

Figure 10:
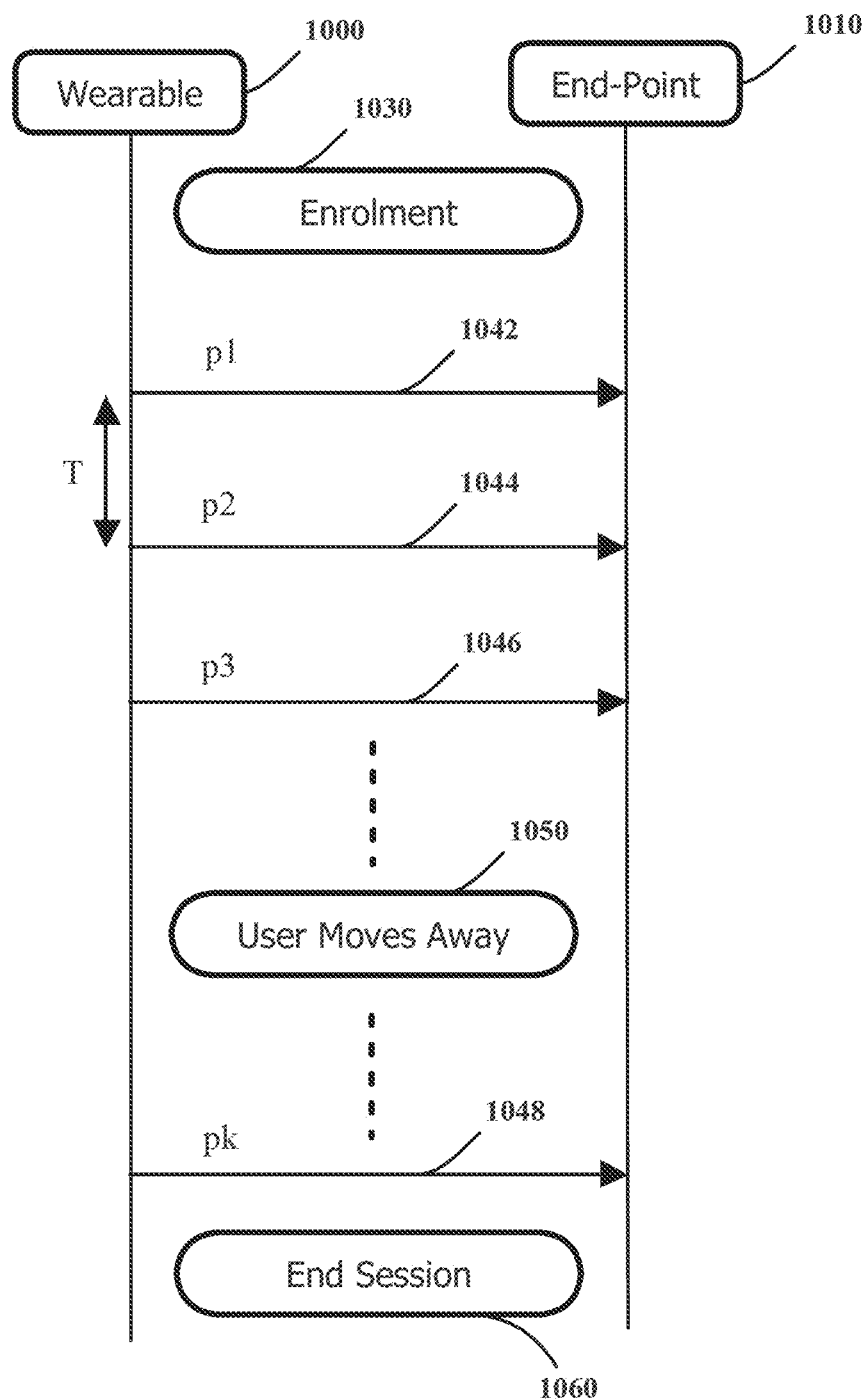
FIG. 10 is a diagram of illustrative exchanges and processes implemented between an authentication device and network application operatively associated with an end-point, where data packets contain activity data, in accordance with one embodiment.

Activity-related data may be used, in accordance with various embodiments, do determine if a user is arriving at, present at, or departing from an access point in order to provide or revoke authentication accordingly. With reference to FIG. 10, and in accordance with one embodiment, an illustrative process of activity-related data (e.g. motion-related data) communication between a wearable user authentication device 1000 and an endpoint 1010 following an enrolment step or presence initiation 1030 will now be described. In this example, the UAD 1000 may transmit data packets 1042, 1044, 1046 and 1048 comprising the ID of the transmitting wearable, the ID of the endpoint, either raw or processed activity-related data, and optionally any other sensor data to the endpoint 1010. In one embodiment, the time between successive transmissions within a session is no greater than time T. The user may move away from the endpoint during the session, such as in the process step 1050, which can be detected on the endpoint by a digital application or algorithm processing the motion and radio signal data. If the time between transmissions exceeds time T, there is a loss of communication (signal drop), the system is no longer in use after a set period of time (timeout), or it is determined that the user is moving away from the device as in step 1050, the process may be terminated (e.g. an authenticated session may be ended), as in step 1060. In this last scenario, the user's departing state can be proactively captured and communicated to the endpoint 1010 via packet pk as an end to the user's presence and thus result in a termination of the active session. Namely, the UAD may directly confirm the user's departing state via onboard processing of activity-related data so to update a presence status identifier in packet pk (1048) to "departing", thus invoking an application operatively associated with the end point to terminate the active session. Conversely, raw or processed activity-related data may be communicated to this endpoint application for processing in confirming the user's departing state and consequently terminate the active session. Onboard processing and/or communication of complementary ranging/proximity/physiological/etc. data can also be taken into account in communications related to terminating packet pk, as will be further exemplified below.

Figure 11:
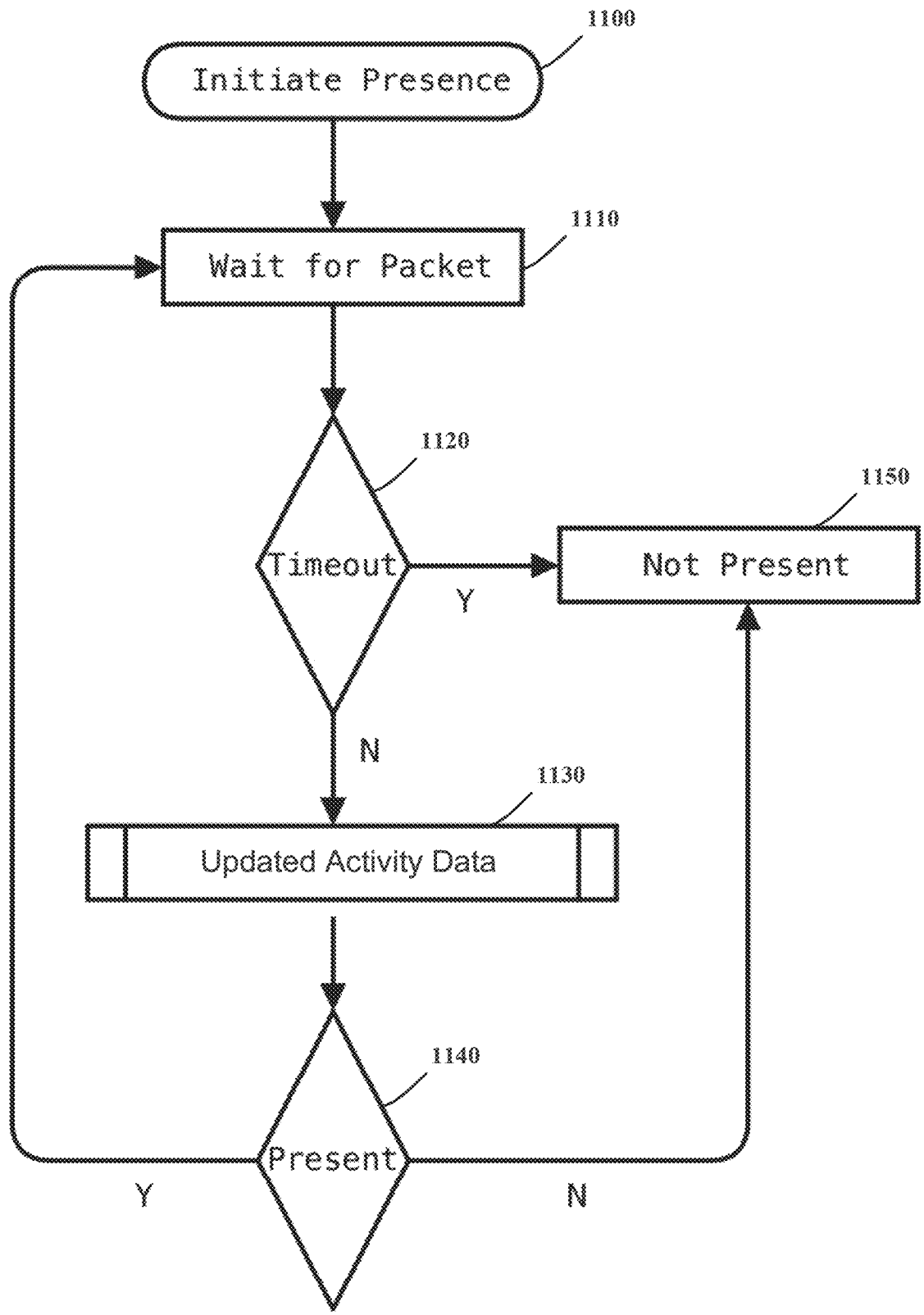
FIG. 11 is a diagram of a process followed by a network application, for example operatively associated with the end-point of FIG. 10, to determine if an authenticated user is present at the end-point, in accordance with one embodiment.

In various embodiments, the processing of activity-related data may be primarily performed at or by an application operatively associated with an endpoint. With reference to FIG. 11, an exemplary process followed by an endpoint to determine if an authorised user is present at the endpoint (or resource operatively associated therewith), and/or an authorised activity is being performed, will now be described. In this embodiment, a tracking session may be initiated by a user, a component of the system on the UAD, or the endpoint, as in process step 1100. During or between transmissions from the UAD (e.g. packet transmission containing User ID, EndPoint ID, raw or processed activity, physiological, range-, motion, or behaviour-related, or other like data), the endpoint may wait for data to be transmitted at 1110. If the time between transmissions exceeds a prescribed threshold, the communication (e.g. session) may timeout at 1120, resulting in a state determination of not present 1150 and termination of the active access session. Upon the timely receipt of a transmitted UAD data packet, however, the authentication state directly (e.g. based on onboard processing) or indirectly (e.g. representative from communicated raw or processed motion-related data) reported by the UAD packet will be updated at 1130.

For example, in embodiments where activity-related data is processed onboard the UAD to dispatch an active user presence status tag, token or identifier, the user authentication status may be automatically updated on the UAD, at or by the endpoint, or an application related thereto, based on the information contained in the dispatch. In other embodiments where at least some of the UAD-captured activity-related data is processed at or by the endpoint, or application operatively associated therewith, for example, as standalone processing or as a complement to other related data, a user authentication status will be updated at the endpoint at 1130 upon completion of this endpoint processing. Either way, if a user authentication state is determined to be accepted (positive, or authenticated) at 1140, the session will be maintained and the endpoint will then wait for a subsequent transmission. However, if the user authentication state is rejected based on activity data (e.g. if activity data is not indicative of an authorised activity, such as if a motion data indicated an active user is taller than an the authorised user, or if wireless network signal ranging indicates that the UAD is not in an appropriate location for a designated activity), the authentication state at the access point may be updated and the active session terminated accordingly.

In other embodiments, however, a change in user activity need not be explicitly communicated to the access point to invoke activity-related termination. For example, where activity-related data is entirely processed onboard the UAD, an "unauthorised behaviour" tag could be replaced by a generic or shared session "termination" tag, in that activity-specific tagging may not be required to achieve a similar purpose. For example, in some embodiments, various system or onboard events may result in the dispatch of a session termination instructions, such as corruption of the UAD or functions thereof, removal of the UAD by the user, deliberate user sign-off, etc. Accordingly, each or any of these events could, in some embodiments, invoke dispatch of a termination signal, token or tag to achieve a common result: termination of the active session. Accordingly, reference herein to the communication and/or processing of activity-related data for the purposes of maintaining and terminating an active user session may be cooperatively merged or distinctly implemented with other session tracking and management functions, and that, without departing from the general scope and nature of the present disclosure.

Figure 16:
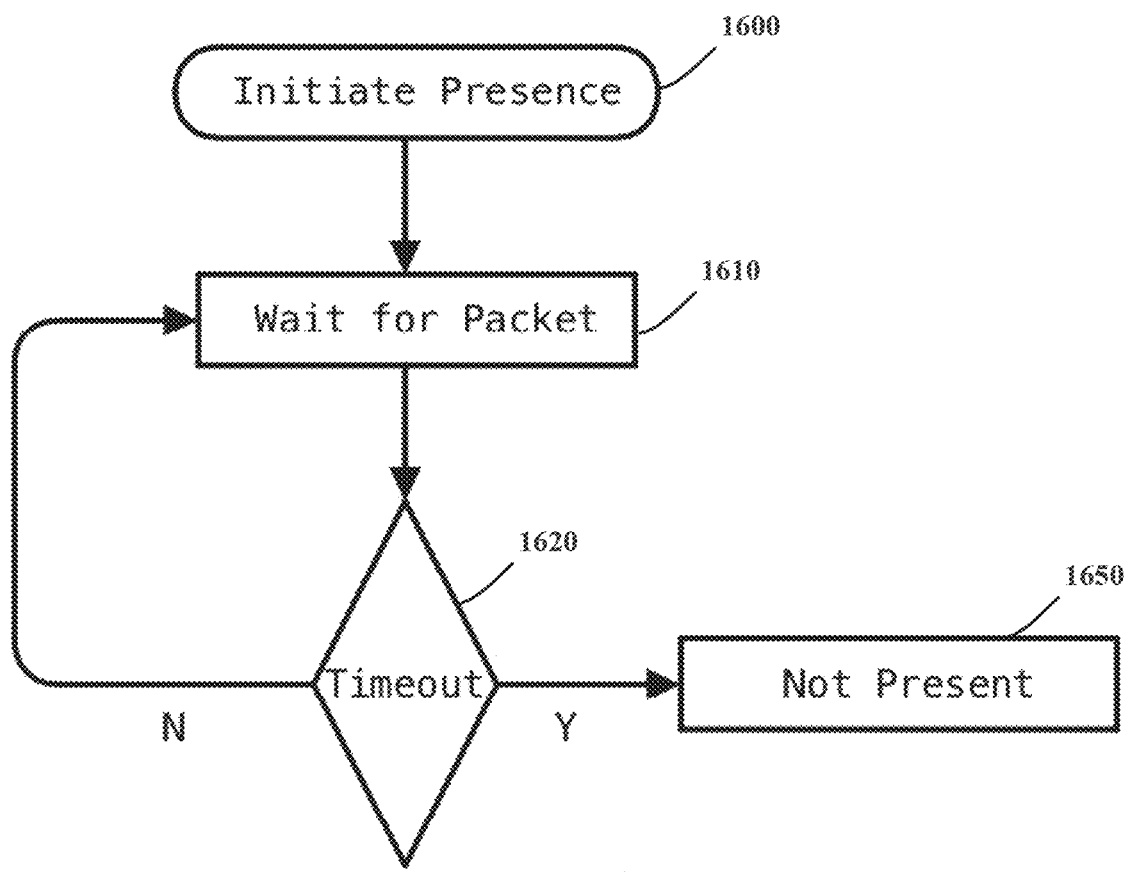
FIG. 16 is a diagram of a process followed by the end-point to determine if a user is present at a terminal, in accordance with one embodiment.

For example, in accordance with another embodiment of the present disclosure, the processing of activity-related data monitoring may be primarily performed on the wearable UAD, whereby it may be fully determined onboard, for example, that the user is departing from an endpoint, and communication of such departure, and related termination of an active session, correspondingly invoked. With reference to FIG. 16, and in accordance with one such embodiment, a simplified exemplary process followed by an endpoint to determine if the authorised user is no longer present at the terminal, will now be described. In this embodiment, a tracking session is initiated by a user on a component of the system on the UAD or the endpoint, as in process step 1600. During or between transmissions from the UAD, the endpoint may wait for data to be transmitted at 1610. If the time between transmissions exceeds a prescribed threshold, the communication will timeout at 1620, resulting in a state determination of not present 1650. Prior to receipt of a packet or a detected timeout 1620, the endpoint will wait for the receipt of a data packet. Activity tracking may also be terminated after it is no longer in use or after a prescribed period of time.

Figure 12:
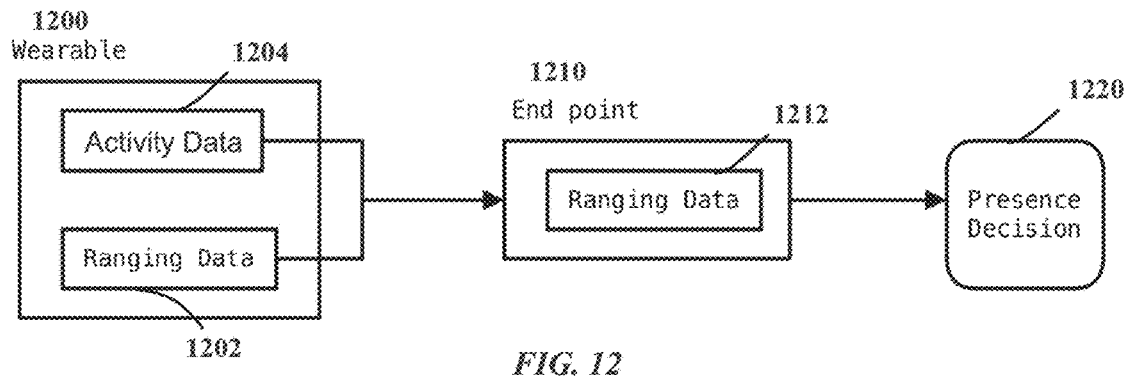
FIG. 12 is a diagram of a presence tracking process to be implemented between a wearable device and an end-point, in accordance with one embodiment.
Figure 13:
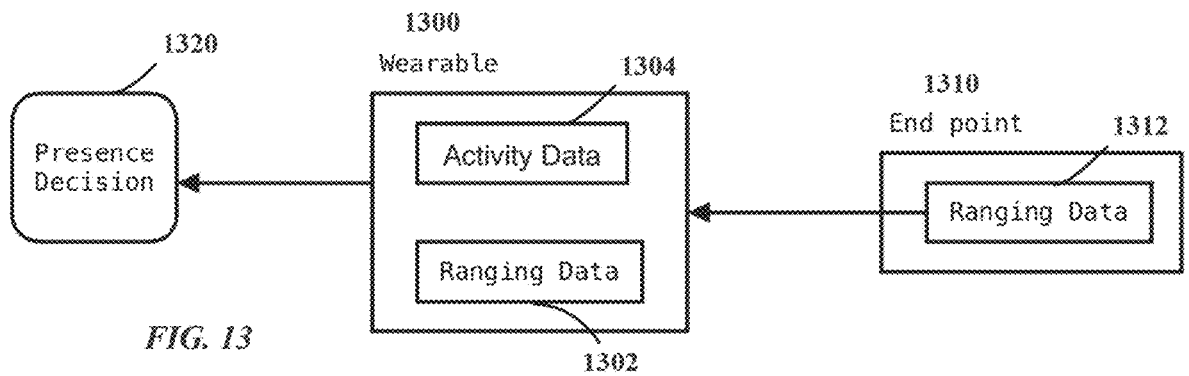
FIG. 13 is a diagram of a presence tracking process to be implemented between a wearable device and an end-point, in accordance with one embodiment.

As described above, some embodiments of the present disclosure employ variants of the direction of communication between system components. A high-level process overview of the direction of communication of one embodiment is shown in FIG. 12. In this example, the wearable UAD 1200 may transmit raw or processed activity-related data, such as motion data 1204 and, optionally, other motion-, range-, or physiology-related data 1202 to an endpoint 1210. A digital process or application operatively associated with the endpoint 1210 may use the transmitted data, optionally with additional ranging-related data 1212 acquired by or in relation to the endpoint, to provide a presence status decision 1220.

In another embodiment, the endpoint 1310 may transmit ranging-related data 1312 to a wearable UAD 1300. An onboard digital process or application may then use raw or processed activity-related data 1304, and/or ranging-related data 1312 communicated thereto, and optionally natively acquired ranging- or other related data 1302, to make authentication decision 1320.

Figure 14:
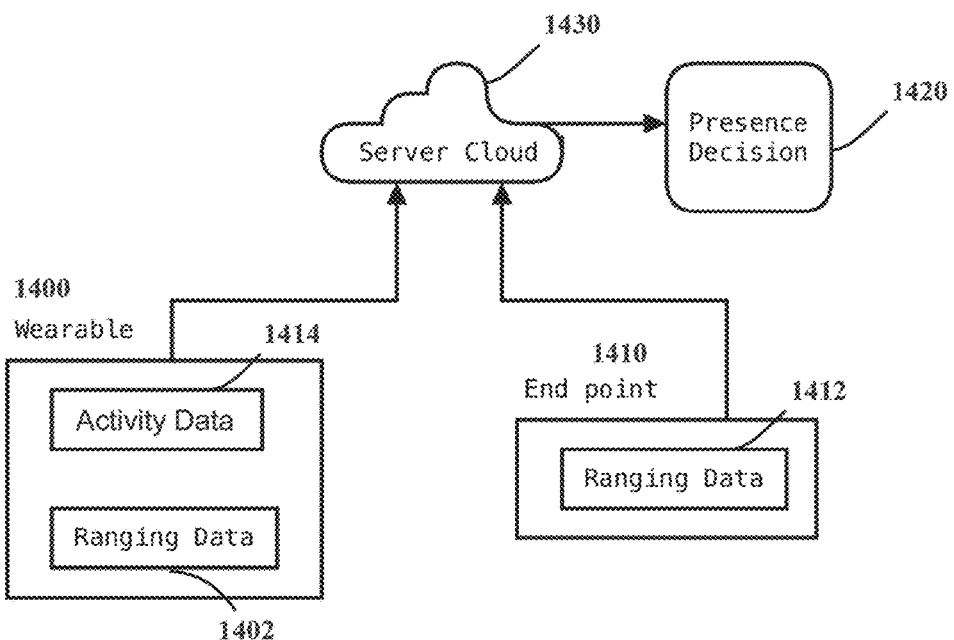
FIG. 14 is a diagram of a presence tracking process to be implemented between a wearable device and an end-point, in accordance with one embodiment.

In yet another embodiment, a high-level process, as illustratively depicted in FIG. 14, includes both a wearable UAD 1400 and endpoint 1410 communicating activity data (e.g. motion) and optionally ranging-related data with an external application, device, or system such as a server cloud 1430. In such an embodiment, raw or processed activity-related data 1414 may be fused with ranging-related or other data 1402 acquired on the wearable UAD 1400 and transmitted to the external application 1430 independent from any ranging-related or other data acquired and/or processed at the endpoint 1410, which may also be optionally transmitted to the external application 1430. Upon receipt of all data, a digital process or application operatively associated with the external application, device, or system 1430 can perform a presence status decision 1420 based, at least in part, on said transmitted data.

In at least one of the embodiments herein described, wearable devices, endpoints, and any external systems are capable of bidirectional communication to both accept and transmit data. Such bi-directional functionality may be employed for reliable and/or secure communication, the means by which this is accomplished will be understood and appreciated by the skilled artisan.

Figure 15:
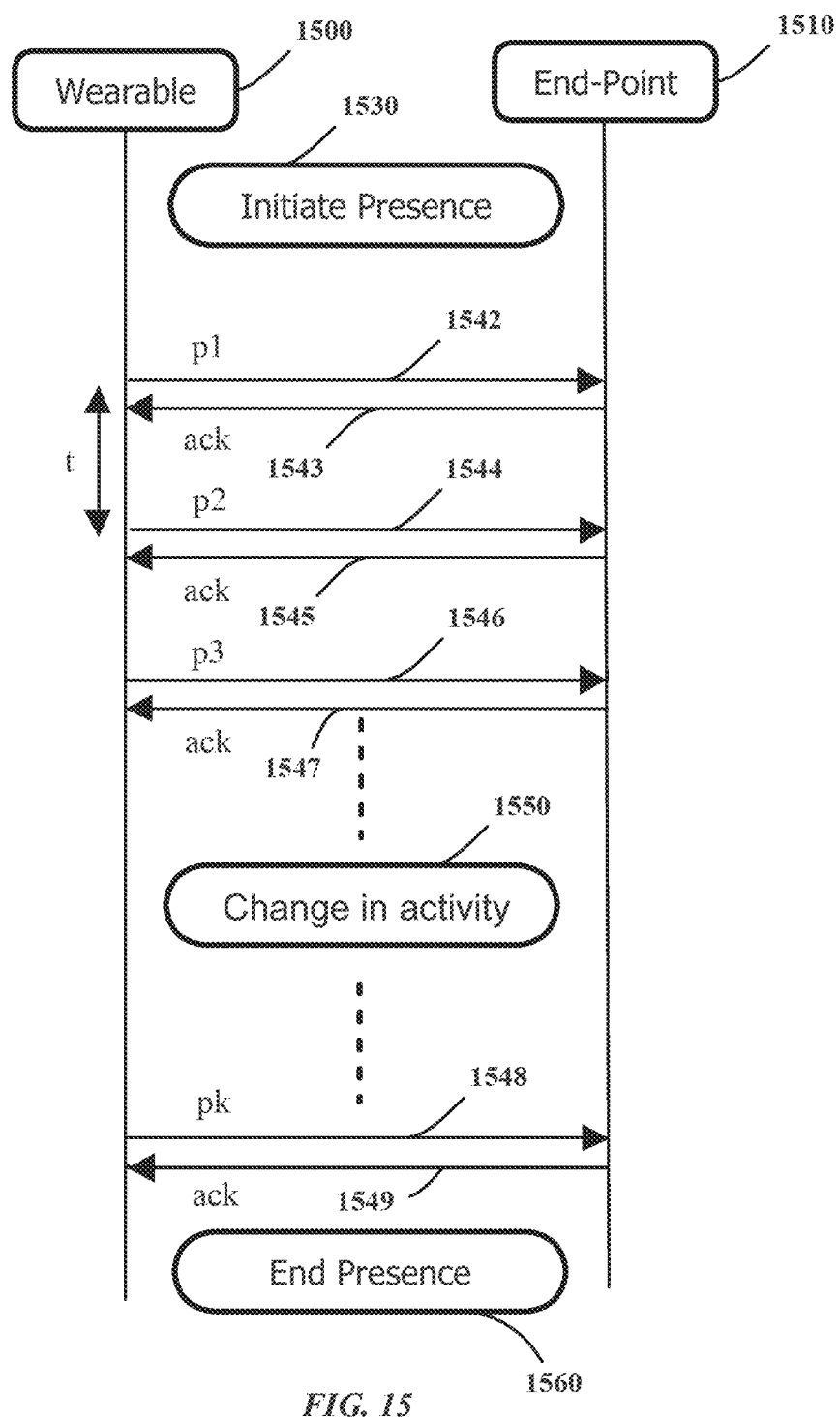
FIG. 15 is a diagram of illustrative exchanges and processed implemented between a wearable authentication device and a network application operatively associated with an end-point, where presence is tracked on the wearable device and a detected departure is proactively communicated to the end-point in terminating an access session, in accordance with one embodiment.

One embodiment of the present disclosure employing bi-directional communication is illustrated in the process diagram of FIG. 15. In this example, the wearable UAD 1500 and endpoint 1510 employ a bi-directional communication following a presence initiation step 1530. The wearable UAD may transmit activity-related data to the endpoint 1510 in data packets 1542, 1544, 1546 and 1548. Following receipt of each respective data packet, the endpoint 1510 may return respective corresponding data packets 1543, 1545, 1547 and 1549 that acknowledge receipt and/or communicate additional information. Any and/or all data packets transmitted may include activity-, motion-, ranging-, or other-related data, as well as the ID of either or both of the UAD and endpoint. Furthermore, signal properties such as time-of-flight or received signal strength from the bi-directional communication, or the time t between successive data packets, may also be used in processing algorithms, located at one or more of the UAD, endpoint, or an external device, to determine presence and/or activity states. In one embodiment, the time between successive transmissions within a session is no greater than a prescribed time T The user may exhibit a change in activity, such as moving away from the endpoint during the session, as in the process step 1550, which can be detected by a digital application or algorithm processing the motion and radio signal data. If the time between transmissions exceeds time T, there is a loss of communication, the system is no longer in use after a set period of time, or it is determined that the user is moving away from the device, or is no longer exhibiting behaviour, performing an activity, or in an environment approved for user authentication, as in step 1550, the process may be terminated, as in step 1560.

Embodiments of an access control system such as those herein described may also require the wearable device to have arrived at the endpoint as part of its access control policy. A control process may also automatically perform a sign-off on behalf of a user if said user is no longer present at the endpoint, or determined to not be in an arrived or present state.

As introduced above, various embodiments may comprise operational modes of activity monitoring wherein most or all processing of activity data is performed on board a UAD, for instance, in situations where privacy is an important consideration. Such embodiments may have various modes, some non-limiting examples of which will now be described, with reference to FIGS. 17 to 19, and in which an activity profile or template can be generated, stored and/or used for comparative purposes in qualifying or confirming an authentication and/or authorisation status of the user.

Figure 17:
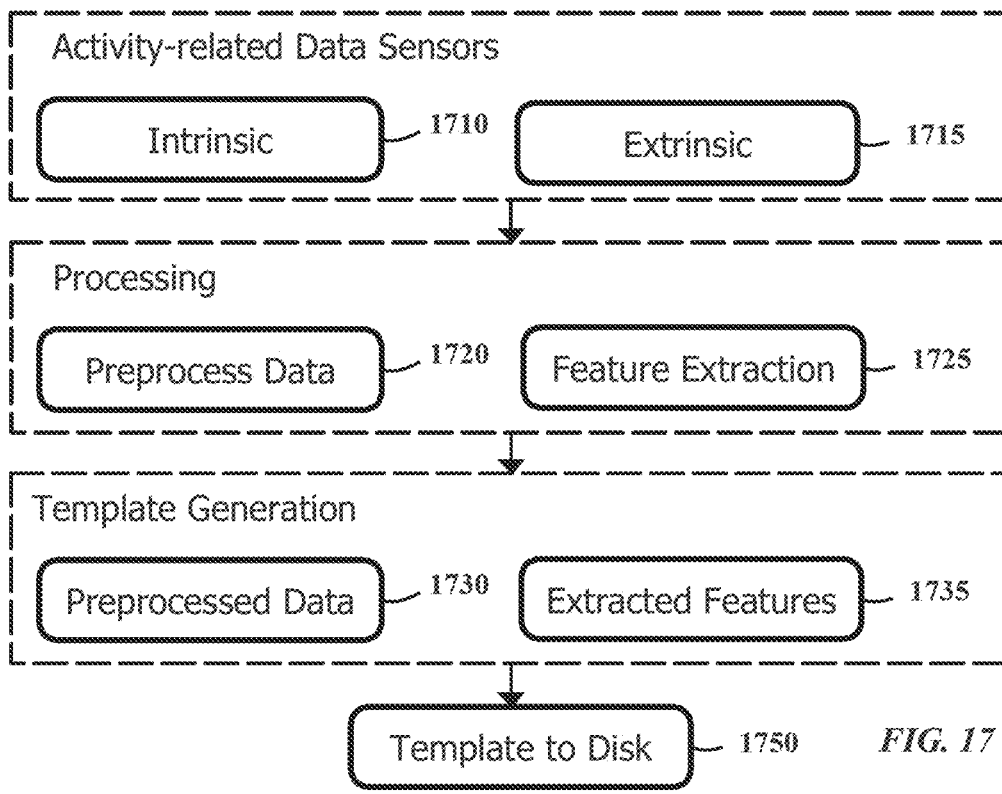
FIG. 17 is a diagram of a process for generating and storing a template including activity-related data, in accordance with one embodiment.

In accordance with some embodiments, if a device does not yet have a template for a particular activity, as in FIG. 17, a wearable device may acquire activity, physiological, motion, or like intrinsic data using one or more intrinsic data sensors 1710 upon use. In some embodiments, environmental data may also be acquired with a corresponding extrinsic data sensor(s) 1715. Such data may be acquired, for instance, during the performance of a particular authorised task, in a prescribed setting, for a particular user. Data may be preprocessed at element 1720 and/or be used to extract features therefrom at 1725. Preprocessed data 1730 and/or extracted features 1735 may then be used to generate an activity template 1750, which may be stored locally on disk (e.g. on board the UAD) for future use. For example, the template could be used as a basis for comparison of future user activity, behaviour, and/or environmental parameters during user activity to continuously or periodically authenticate a user.

Figure 18:
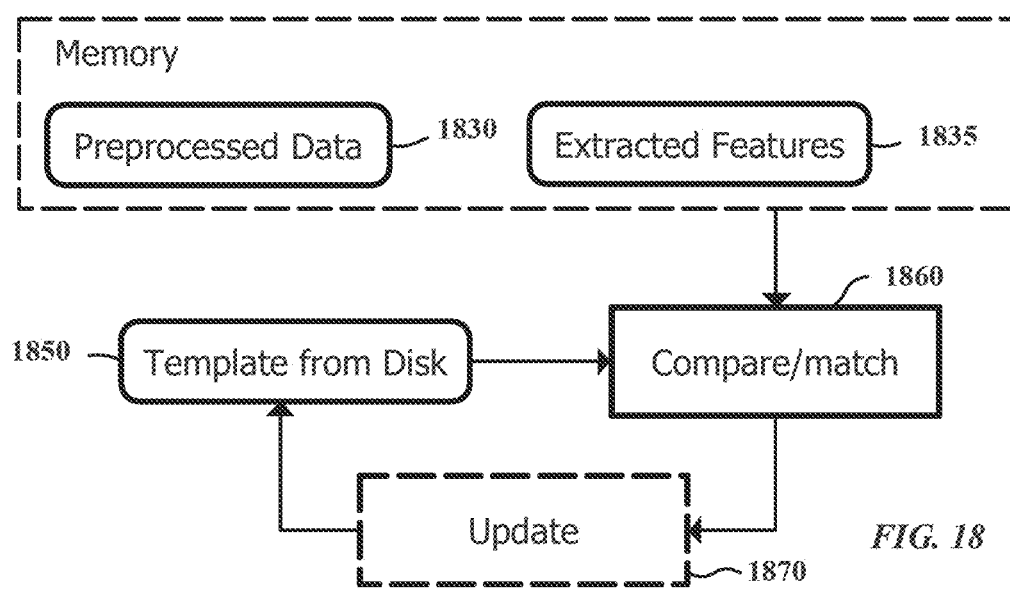
FIG. 18 is a diagram of a process for updating a template from processed data acquired throughout an authenticated session, in accordance with one embodiment.

Alternatively, and in accordance with various embodiments, if a device already has an activity template stored thereon, as in FIG. 18, activity data, such as preprocessed data 1830 or features extracted therefrom 1835 may be compared with or matched against the template 1850, as in step 1860. The results of such comparisons and/or matching, such as pass/fail results for various data, may be stored on the UAD. In some embodiments, a template 1850 may be updated with pass/fail results, or newly compared data 1830 or extracted features 1835. The updated template 1850 may in such embodiments then be securely stored on disk (e.g. on the UAD).

In some embodiments, template generation and/or updating, as shown in FIGS. 17 and 18, respectively, may be performed during a UAD idling phase. For instance, processed data and/or extracted features may be temporarily stored in a form of memory on a UAD while it is in active use. At the end of a work day, or work session, or, for instance, if a UAD is being charged, such template generation or updating steps may be performed as power and/or memory resources become available. Alternatively, in other embodiments, templates may be continuously updated as data, including raw, processed, or feature-extracted data, becomes available. In either case, various embodiments of the disclosure relate to updating user profiles continuously or periodically, and in so doing, may improve security and/or activity analysis via increased and/or improved data availability.

Figure 19:
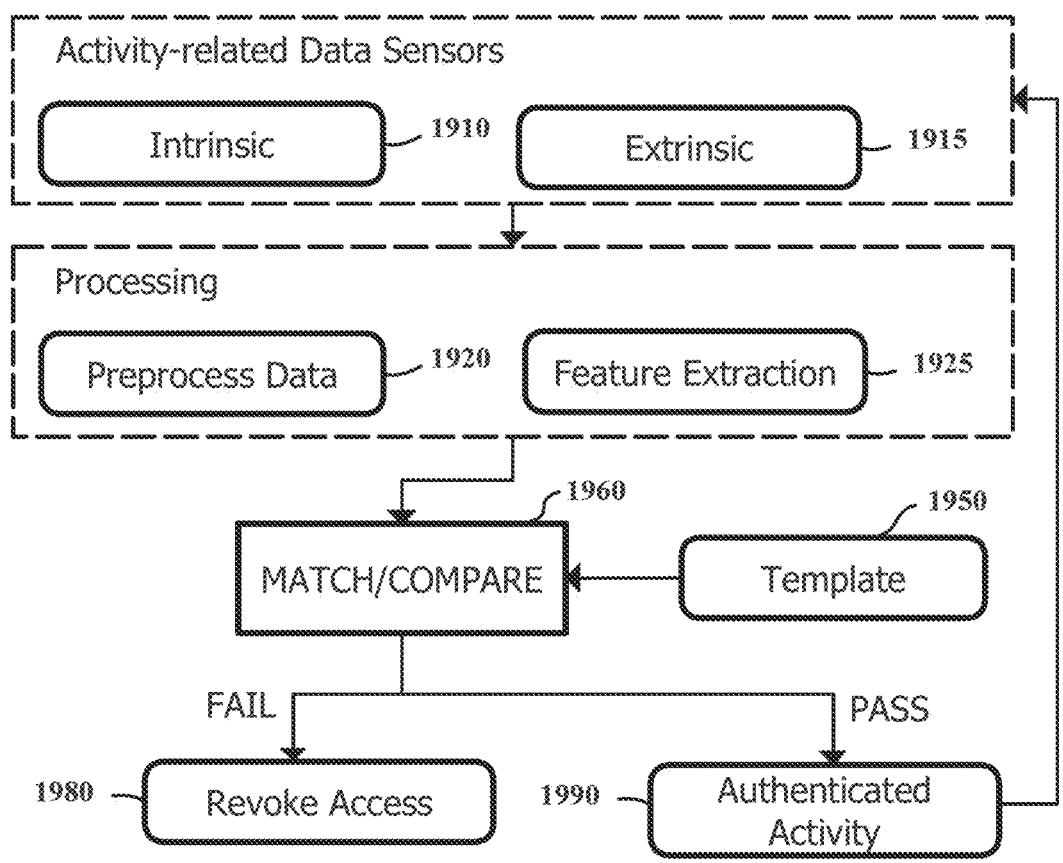
FIG. 19 is a diagram of a process for authenticating a user based on activity and/or environmental data, in accordance with one embodiment.

In some embodiments, when a device is being actively used, such as in FIG. 19, an intrinsic sensor or sensors 1910 may collect user activity data (e.g. movement, PPG, body temperature, etc.). Another sensor(s) 1915 may additionally or alternatively collect environment data (e.g. BLE environment, ambient temperature, ambient lighting etc.). Such data may be preprocessed at 1920 and/or have features extracted therefrom at 1925. Such raw or processed data may optionally be securely stored on the device. Either raw or processed data may then at step 1960 be compared with or matched against one or more activity profiles 1950 stored on the device which correspond to one or more authenticated activities, which may be user-agnostic or relate to performance of the activity by a specific user or users. Should this comparison of activity and/or environmental parameters with pre-approved metrics (or profiles) fail to prove that an appropriate task is being performed in an appropriate setting, and/or that task being performed by an appropriate user, any or all authentication privileges may be revoked for a particular user and/or device at step 1980. However, should the matching and/or comparison pass a designated criterium or criteria, a user may be authenticated at 1990, for instance, to continue using a resource. Activity and/or environmental monitoring may then continue to ensure that the authenticated user maintains possession of the UAD, for instance, or remains in a designated area.

Embodiments may also optionally comprise a notification device, system or process on the wearable and/or the endpoint to notify a user or potential user of a presence state (i.e. arriving, present, or departing), or other result of activity and/or environmental authentication. For example, a user may receive a notification on the wearable UAD or at the endpoint that the presence state transitions from arrived to departing. In such an embodiment, the notification may give the user a window of time in which they have the opportunity to change their position or orientation, or perform a behavioural cue such as a gesture, in the event that the estimated state does not correspond to the user's intended state. In another exemplary embodiment, a notification may be initiated when a presence state of arrived or present is detected in order to receive confirmation, for example by a hand gesture or the like, that a user intends on gaining access to the endpoint.

In general, but not by necessity, the abovementioned systems and processes may be employed following a presence initiation step to ensure privacy and/or security in access control systems. The following description is provided to give context to some non-limiting examples in which the systems and processes for which protection is hereby sought may be implemented for such access control systems.

Figure 6:
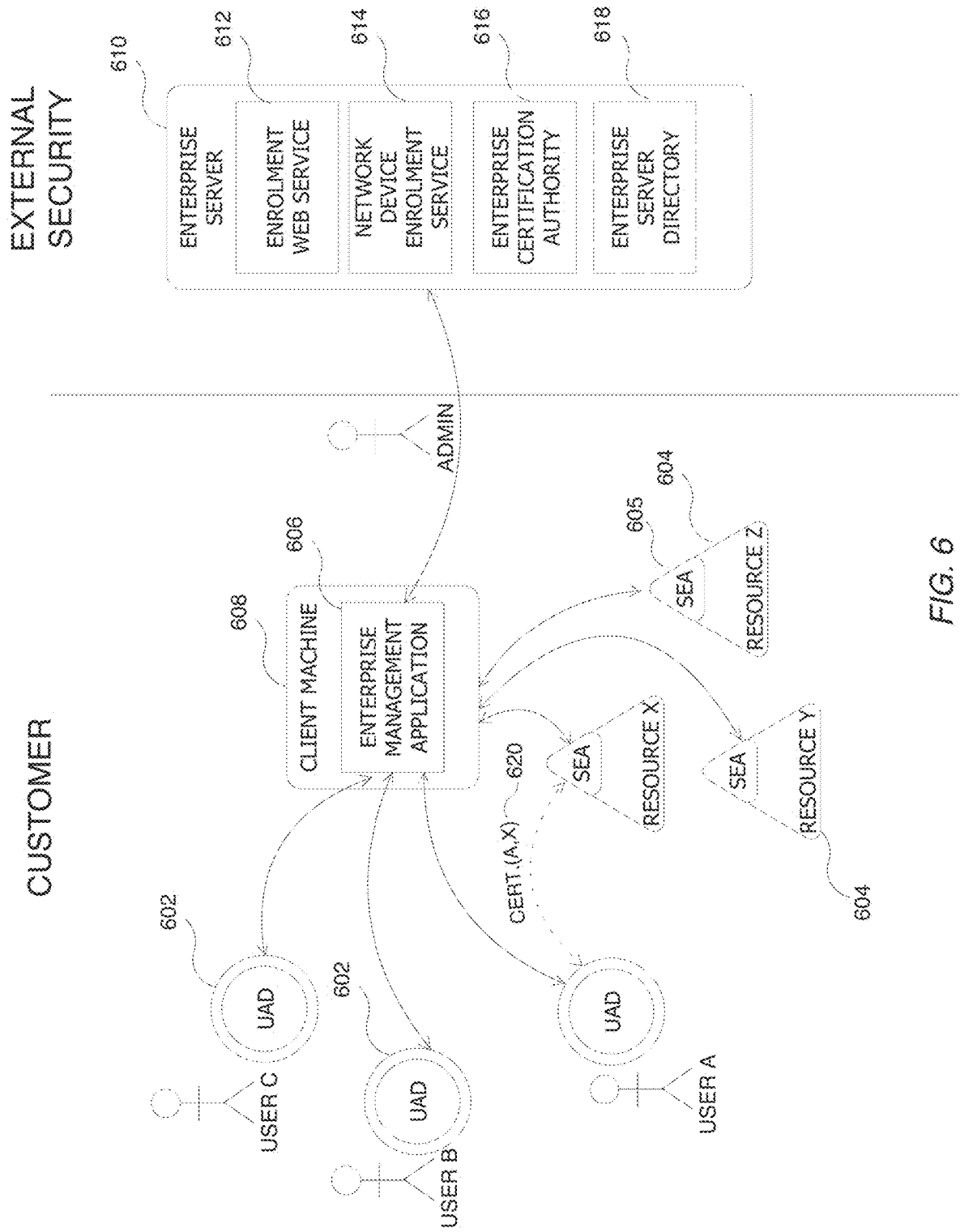
FIG. 6 is a high-level system diagram illustrating various user authentication devices (UAD) operable to authenticate a user and/or gain access to distinct network-application enabled resources, in accordance with one embodiment.

With reference to FIG. 6, and in accordance with one embodiment, a high-level system architecture for managing authenticated user identities, authenticating user presence and/or access authorizations, will now be described. In this example, a set of end users are provided with a corresponding set of portable (wearable) user authentication devices (UAD) 602 to be used to authenticate each end user (e.g. via PIN, password, onboard biometric authentication, behavioural cue, etc.) for the purposes of communicating an authenticated user identity, for example, in authenticating a user presence and, in some further examples, gaining user access to one or more customer resources 604 accordingly. Various measures to ensure secure user authentication, live user presence, prevent fraud, collusion or the like are illustratively described below, as are other complementary/alternative means for securely authenticating the user via onboard and/or communicatively accessible authentication and status broadcast resources.

Following from the onboard authentication examples further described below, once a UAD is active, it may be used to securely authenticate the user, for example, to gain authenticated access to certain authorized resources 604 whose access may be at least in part operatively controlled by a security-enabled (network) application 605 operating locally or distributively to communicate with nearby UADs 602 via a related access point or like communication path. For example, a given UAD 602 may be logically linked to a particular user to perform onboard user authentication to activate the UAD 602 and thus actively or selectively communicate or broadcast a user-authenticated status or authenticated user identity. For example, an actively authenticated or pre-authorized UAD may transact with one or more instances of a security enabled (network) application 605 that can be operated to recognize, monitor and/or track an authenticated user presence, for example, to grant authenticated user access to one or more corresponding resources 604 operatively associated therewith. For example, the network application 605 may be operated to securely identify the authenticated user (e.g. using one or more (mutual) user/device/application authentication procedures) in providing authenticated access to the corresponding resource if so authorized. For simplicity, the following examples will relate to a system for granting authenticated user access privileges to authenticated users based on successful user identification, authentication and communications relating thereto between a given UAD and network application (instance).

Accordingly, and as will be detailed below with reference to certain illustrative embodiments, each end user (User A, B, and C) may be attributed one or more customer access privileges or authorizations (e.g. to X, Y and/or Z) to be implemented via their respective UAD 602. To do so, respective digital certificates may be issued to accommodate such diversified access privileges; namely User A may seek to enrol a user-specific certificate to access Resource X (e.g. certificate (A,X) 620)), User B may seek to enrol respective user-specific certificates to respectively access each of Resources Y and Z (but not X), and User C may seek to enrol respective user-specific certificates for each resource along with possibly a higher level authorization certificate to access the enterprise management application 606. Each certificate can then be used to successfully negotiate access to its corresponding resource via the resources' respective SEA instances 605 or Enterprise Management Application (EMA) 606.

In the illustrated embodiment, an external enterprise security services system is implemented for the purposes of providing customer security services in which multiple user authentication devices can be used to routinely authenticate authorized end users and manage user access privileges accordingly. For example, and with reference to the illustrative embodiment of FIG. 6, end user certificate enrolment, processing and related provisions are implemented via an external (standalone) CA 616, enterprise directory 618 and related sources, for example, to reduce customer impact and touch points in outsourcing management of such security resources (which external resources can be used to concurrently provide security management services to various customers interfacing therewith). In this embodiment, an enterprise management application 606 operates on a customer/client machine (e.g. local network infrastructure) 608 that interfaces with an enterprise server 610 operated by the external security services provider to process certificate enrolment requests, optionally among other UAD enterprise setup procedures, and related security provisions and procedures. The enterprise management application 606 may not only interface with the various UADs for the purposes of enterprise setup, processing and maintenance, but also optionally to provide administrative functions in linking respective instances of the security-enabled applications 605, for example, for software/firmware update, synchronization and/or resource sharing, e.g. via secure local network database 622 or the like. Access to a local or server-based enterprise directory or database may also be facilitated through a centralized management hub or application, as can other system architectures and/or configurations be considered.

In order to implement and manage various secure transactions between the UADs 602 and SEAs 605, different encryption key management, deployment and establishment procedures may be considered, along with their associated digital certificate enrolment, management and verification procedures. In U.S. Pat. No. 9,197,414, exemplary protocols were described that relied on Bluetooth Low Energy (BLE) advertising procedures using symmetric provision keys. Using this approach, however, various symmetric key establishment and management procedures were required.

As an alternative, and in accordance with some embodiments, short-term symmetric advertising keys can be used in the following examples to mitigate challenges common to the implementation of symmetric provision keys, as noted above. For example, and as will be detailed below, a short-term symmetric advertising (STSA) key can be used by a portable user authentication device (UAD) to periodically compute and advertise an authentication code recognizable by one more instances of the security-enabled application (SEA) executed in association with a corresponding access point and/or resource to which the authenticated user has authorized access, to invoke certain user access privileges associated therewith, and this, without invoking symmetric provision key management protocols and/or system architectures required therefor. In such examples, a STSA key can be negotiated, agreed upon and/or otherwise applied between a given UAD and one or more security-enabled applications based on one or more pre-established encryption key pairs/certificates, and used during a lifetime of the STSA key to provide ongoing authenticated user access privileges accordingly. Naturally, each UAD may actively broadcast one or more STSA key-based authentication codes, for instance, depending on the nature and/or complexity of the user's access privileges (e.g. one STSA key may be applied for each SEA instance, access point and/or resource for which the user has authorized authenticated access). In other exemplary implementations, a single STSA key may be used by a given UAD to advertise and concurrently or sequentially gain access to multiple access points/resources whereby multiple SEA instances, for example, synchronize and/or share information relating to this common STSA key via a secured back-end infrastructure, database or directory, for example.

For simplicity, the following examples will consider the simplified implementation where each UAD advertises on the basis of a single STSA key to interface with a single authorized SEA and related access point/resource. In each example, the authentication code periodically communicated by a given UAD may be accompanied, in some embodiments, with motion-related data so to provide further confirmation of a user presence status in respect of the target access point. For example, raw or processed motion-related data may be communicated along with the authentication code for processing by resources operatively associated with the access point, whereas in other examples, a user presence status indicator may otherwise be computed and communicated along with the authentication code, for example, as an authentication code packet tag, indicator or header component. In this latter example, such motion indicator may be selected from one of arriving, present or departing, as noted above, or other similar indicators as may be appropriate and readily appreciated by the skilled artisan, which indicator can then be appropriately recognized and processed by the access point or resources operatively associated therewith. In yet other embodiments, motion-related data or indicator (s) can be relayed independently of such authentication codes, for example, in a secure fashion given an established secure data channel between the authenticated UAD and access point. Other examples may readily apply, as will be readily appreciated by the skilled artisan.

Following from the above example with option to incorporate or embed a user presence status indicator along with an authentication code linked to a defined STSA key, each STSA key will generally have a defined lifetime, to be defined in accordance with what may constitute a secure or safe lifetime within the context at hand, such that it can be used during that lifetime to securely advertise and identify an authenticated status of a particular user/UAD for gaining access privileges controlled, at least in part, by security-enabled applications associated and operable to grant or deny such privileges. For example, the lifetime of a particular STSA key may be a configurable parameter whose value is adjusted, for example, according to a potential security risk associated with this key and/or based on an average lifetime required or associated with a typical user access event. For example, a key to access a highly sensitive resource or that may be highly vulnerable to external attack or misuse, may have a comparatively short lifetime, as would a key used to access one-time resources such as a door lock or gateway. Conversely, a key that does not pose a significant risk and/or that is required to maintain user access for a longer time period (e.g. a workstation, device or equipment), may benefit from a longer lifetime, thereby avoiding the renegotiation and/or establishment of a new key for subsequent or maintained activity. Accordingly, a STSA key may have a lifetime ranging from 30 second or a minute, to a few hours or even a day. In some situations, an authentication code generated on the basis of this key for advertisement may be recomputed every few seconds, for example, where active engagement and authenticated access is required to maintain active access to a particular resource. For example, always-on authentication may be required while an authorized user is working on or with a particular workstation, device or equipment, but immediately turned off, terminated or locked when this user leaves the area. Accordingly, the typically short-ranged advertisement signal (e.g. Bluetooth LE) will regularly advertise a new authentication code based on the active STSA key (e.g. every few seconds) such that, when receipt of such routine authentication code is lost (or where a signal strength associated therewith drops below a particular threshold, or where other proximity measures report an above-threshold user distance), access authorization can be automatically terminated.

Figure 7:
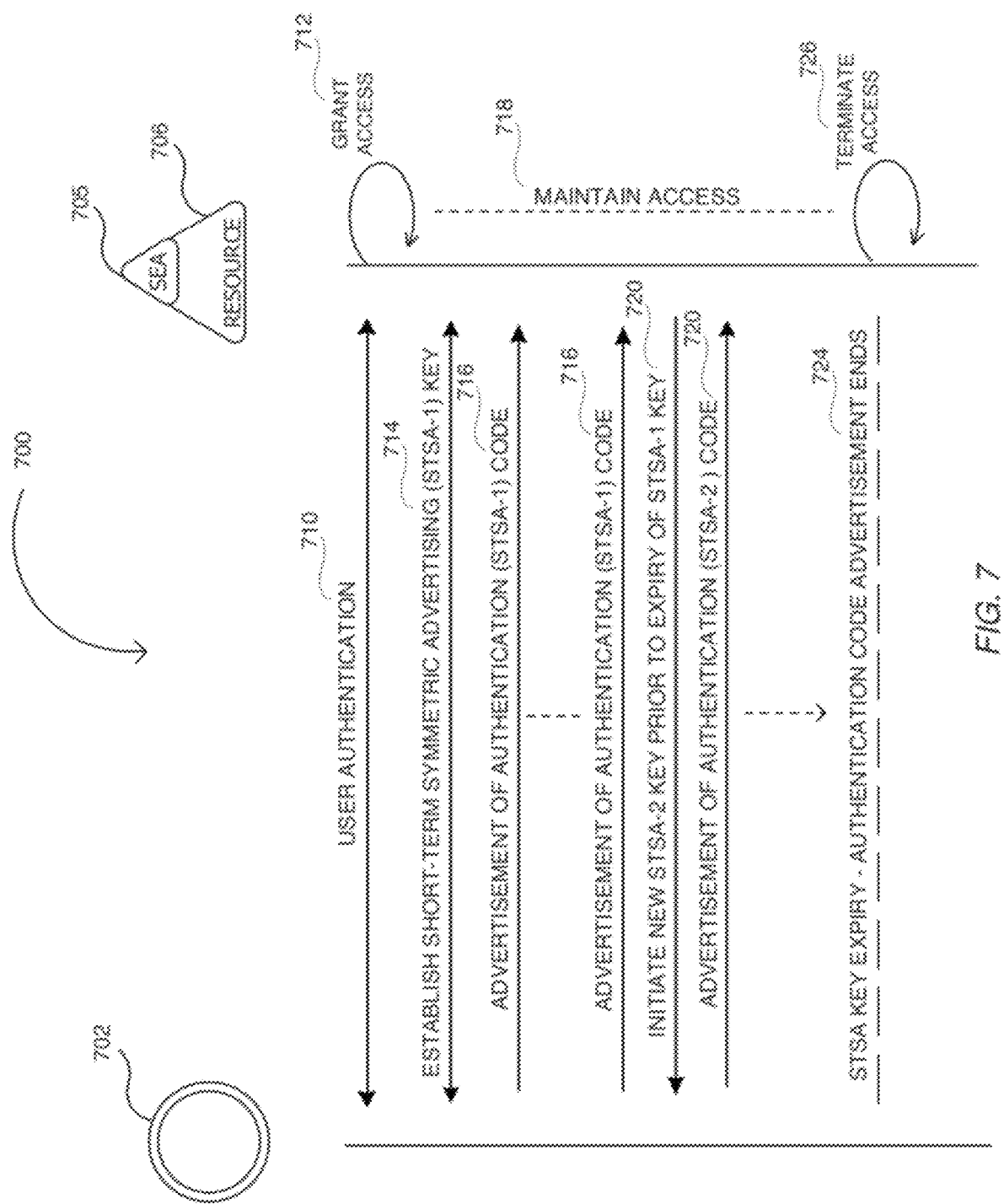
FIG. 7 is a diagram of illustrative exchanges and processes implemented between an authentication device and network application in authenticating a user and/or gaining/maintaining authenticated access to an associated resource, in accordance with one embodiment.

With reference to FIG. 7, and in accordance with one embodiment, an illustrative process 700 for implementing STSA key procedures between a given authentication device 702 and network security-enabled application 705 (and associated resource 706), will now be described. In this illustrated process 700, user/mutual authentication can be completed at 710 using, for example, public key cryptography and/or a symmetric session key process. This may be initiated, for example, by the device upon approaching the resource, by a user action on the device or portable application executed thereon, and/or user action via the network application. Upon successful authentication, the SEA 705 grants the user access to the resource 706 at 712. Further details in this respect are discussed below with reference to an embodiment of such user authentication shown in FIG. 9.

Following with the example of FIG. 7, upon granting the user access to the resource in question, the device 702 and network application 705 will establish a short-term symmetric advertising key at 714, denoted here as STSA-1. In some embodiments, an STSA key may be agreed upon or selected in accordance with one or more key agreement protocols, such as an anonymous authenticated key agreement protocol, namely an authenticated elliptic-curve Diffie-Hellman (ECDH) key agreement protocol, which may be implemented to establish a shared secret (i.e. STSA key) to be used in subsequent communications. Other key agreement protocol may also or alternatively ben considered, such as a Diffie-Hellman (DH) key agreement protocol or a Rivest-Shamir-Adleman (RSA) key agreement protocol, to name a few examples. As noted above, while each device will typically negotiate its own STSA key(s), one or more STSA keys may be shared by a same device amongst multiple network application instances.

Once a STSA key has been established, the device 702 will periodically compute and advertise an authentication code, shown as steps 716, based at least in part on the active STSA key. Such routine advertisement will allow the SEA to acknowledge the maintained presence of the authenticated user and device within its vicinity and thus maintain the granted access to the resource 706 at 718. In some embodiments, authentication code advertisement may be implemented every few seconds or minutes via a Bluetooth Low Energy (BLE) protocol or other wireless communication protocols (e.g. near field communication (NFC), ultra-wide band, RFID, or Wifi), as noted herein. In so long as the STSA key-based authentication code is advertised and received by the network application 705, the granted access can be maintained. In order to prolong granted access beyond the prescribed lifetime of the STSA key (STSA-1), which may be in the order of a few minutes or hours, the network application 705 may initiate renewal or establishment of a new STSA key (STSA-2) at 720 prior expiry of STSA-1, whereby the device 702 can then proceed to compute and advertise new authentication codes based on this new STSA key at 722.

Once the lifetime of a given STSA key expires without first being renewed (e.g. at the end of the day, when a user goes out of range for a prolong period that prevents renewal, etc.) and the network application 705 ceases to receive valid authentication codes (724), authenticated access is terminated at 726. Naturally, authenticated access can be regained upon repeating the steps in this process, which may be initiated automatically and/or triggered by user action, for instance, signalling a desire to re-establish authenticated user presence/access at the location. Such triggered reinstatements may include, but are not limited to, user action on the UAD (e.g. to trigger further STSA key advertising, for example, by awaking the UAD from a sleep or battery-saving mode), the designated resource and/or network application (e.g. probing, activating or awaking a local application, executing a gesture associated with a local resource such as touching, swiping, gesturing or handling a physical interface), and/or other user-initiated actions as may be readily appreciated by the skilled artisan.

Figure 8:
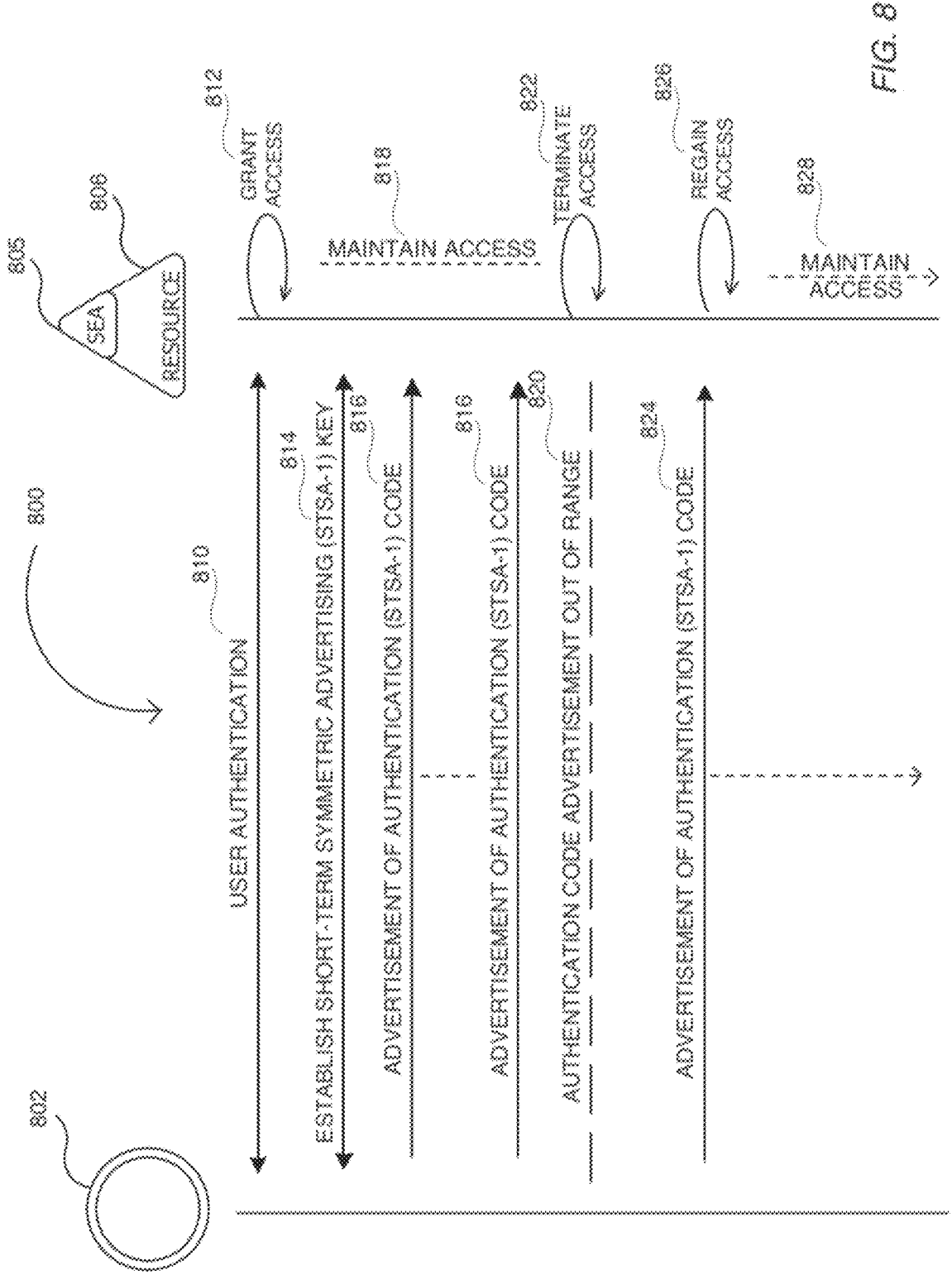
FIG. 8 is a diagram of illustrative exchanges and processes implemented between an authentication device and network application in authenticating a user and/or gaining/maintaining authenticated access to an associated resource, in accordance with one embodiment.

With reference to FIG. 8, and in accordance with one embodiment, a similar STSA process 800 is described to illustrate an exemplary process in the event that an authentication device 802 moves out of range of a target network application instance 805 and resource 806. In this example, user/mutual authentication is again completed at 810 using, for example, public key cryptography and/or a symmetric master/session key process. Upon successful authentication, the SEA 805 again grants the user access to the resource 806 at 812. Upon granting the user access to the resource in question, the device 802 and network application 805 will establish a short-term symmetric advertising key at 814. The device 802 will again periodically compute and advertise an authentication code, shown as steps 816, based at least in part on the active STSA key, and access privileges will be maintained (818) accordingly.

At 820, however, authenticated advertisement packets are no longer successfully received or processed by the network application instance despite the STSA key remaining active. This may, for example, be the result of the user leaving the area of the resource (e.g. device signal out of range). Access is thus proactively terminated at 822. The device may nonetheless continue to advertise valid authentication codes, for example, when leaving one authorized area or resource to another where a same STSA key, for example, may be applied. Within the context of motion-related departure detection, as described above, this particular scenario would imply a failure by the system to proactively detect a designated departure motion. Rather, in accordance with one of the herein-described embodiments, an onboard UAD user presence status indicator would be updated to identify the user as departing upon the user starting to move away from the access point, which status would be communicated to the access point accordingly along or as part of the last authentication code 816, and that, possibly long before the UAD becomes out of signal range. In doing so, the user access session can be proactively terminated to minimize the amount of time the target access point or resources remains available through a still-pending user access session.

In this simplified example, when the user and device 802 return within range of the SEA instance 805, receipt and processing of the advertised STSA key-based authentication codes will resume at 824 and access regained at 826. Such access will again be maintained (828) in so long as valid authentication codes are broadcast and successfully received and processed, and in this particular example, while bearing an appropriate user presence or authentication status indicator (e.g. present, or identified as an authorised user based on behaviour and/or environment).

Figure 9:
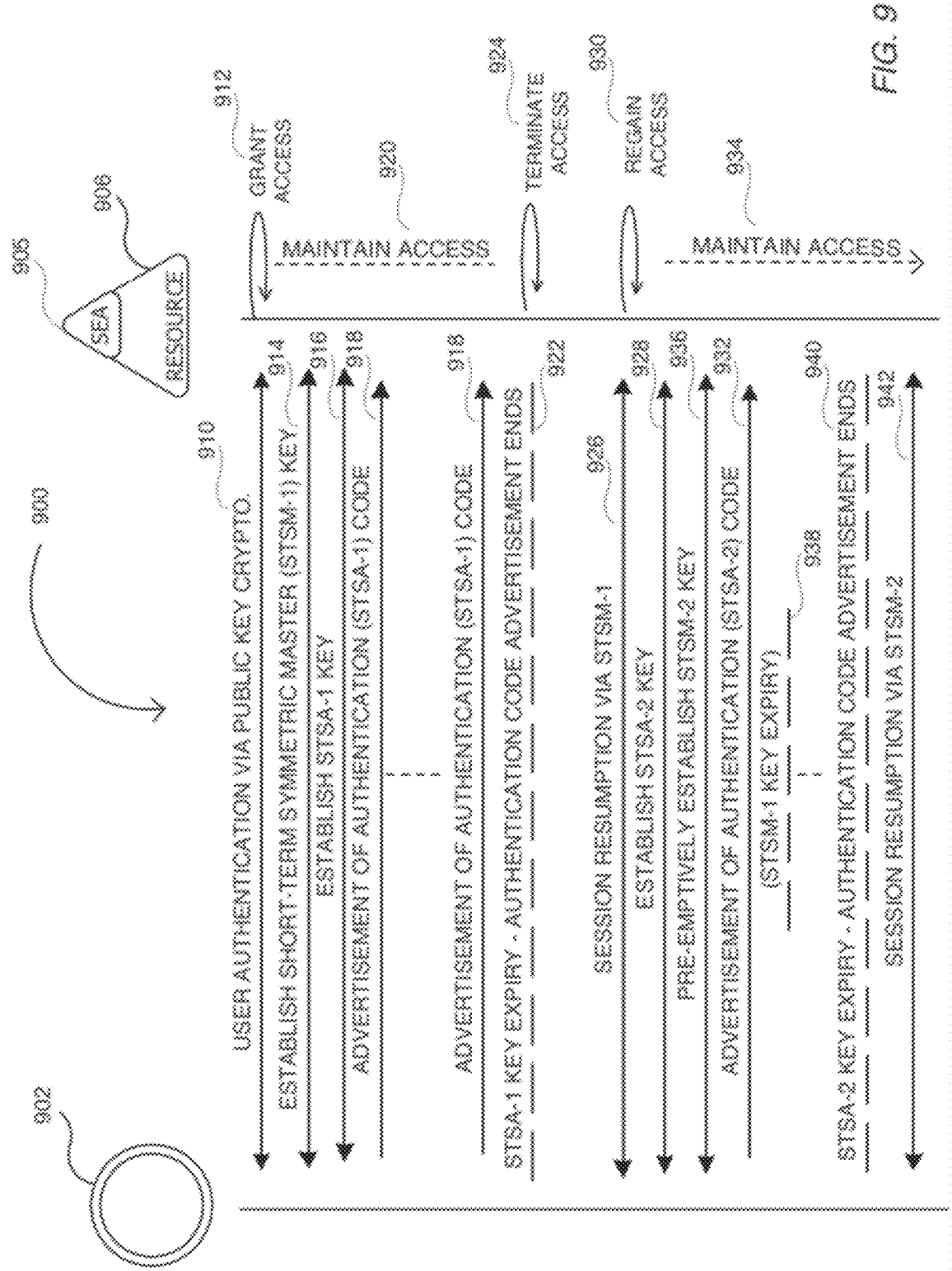
FIG. 9 is a diagram of illustrative exchanges and processes implemented between an authentication device and network application in authenticating a user and/or gaining/maintaining authenticated access to an associated resource, in accordance with one embodiment.

With reference to FIG. 9, and in accordance with some embodiments, an illustrative process 900 for invoking, maintaining and revoking authenticated access to a particular resource linked to a network application 905 via an authentication device 902, will now be described. In this particular example, the device 902 and application 905 will execute a prescribed security protocol, for example, using public key cryptography and certificates, to establish a secure connection therebetween. This may be used, for example, to execute one-way/mutual authentication between the device 902 and application 905, and, in some embodiments, may incorporate a "session resumption" mechanism for performance optimization (e.g. Transport Layer Security (TLS) protocol 1.2 and 1.3). For example, in session resumption, after an initial successful authentication, a symmetric key ("master secret" or "master key", noted herein as short term symmetric master (STSM) key) can be used for subsequent authentication to reduce subsequent authentication latency by removing the need to send certificates over the network and the need to perform public key operations (which are more computationally-intensive than symmetric key operations). In such applications, the symmetric master key will generally have a limited lifetime for security reasons. Namely, after the master key has expired, the next authentication will revert back to using public key operations with the associated performance penalty. Notably, if a client (e.g. UAD 902) detects that the master secret has expired, it will revert to a full authentication sequence using public key cryptography. Likewise, if the server or related network application (e.g. SEA 905) detects that the master secret has expired while the client requests session resumption, the server will indicate to the client that session resumption is not possible. Both sides then revert to using public key cryptography. Accordingly, periodically (every time the master secret expires), an authentication will take longer than usual due to the need for certificate exchange and public key operations, as opposed to implementing authentication using the symmetric nature of the now expired master secret.

Given this arrangement, and within the present context, a master secret lifetime may be set in accordance with various criteria, such as potential risk factors, use cases, user convenience, computation resources on either end, and/or a potential user or application performance impact factor associated with lag times/latencies typically associated with public key processing. Accordingly, a master key lifetime of a few hours to a few days may be reasonable in some circumstances, as compared to a few weeks or even months in other lower risk scenarios.

As will be appreciated by the skilled artisan, various mechanisms may be deployed to establish a master key post authentication, such as via a key agreement protocol as discussed above with respect to the establishment of a STSA key.

Following with the example of FIG. 9, once initial authentication has been completed at 910, the user is granted access at 912, and the STSM key has been established at 914, the device 902 and network application 905 will establish a short-term symmetric advertising key at 916, denoted again here as STSA-1. Once a STSA key has been established, the device 902 will again periodically compute and advertise an authentication code, shown as steps 918, based at least in part on the active STSA key. Such routine advertisement will allow the application 905 to confirm the maintained presence of the authenticated user and device within its vicinity and thus maintain the granted access to the resource 906 at 920 until the STSA key expires, for example, at 922 and authenticated access is correspondingly terminated at 924.

The session may nonetheless be resumed at 926 by performing a symmetric key authentication using STSM-1, presuming it remains active (i.e. within its initially prescribed lifetime), and thus regain access at 928. Since the STSA-1 has now expired in this example, a new STSA key (STSA-2) is established as above at 930 to compute and advertise a valid authentication code at 932 to maintain the renewed access at 934.

In this example, to avoid having to eventually re-initiate a session with the application via public key cryptography, as in 910, upon STSM-1 expiry, a new STSM key is pre-emptively established at 936. For example, in some embodiments, a client (e.g. UAD 902) may be configured to preemptively perform a full authentication using public key cryptography in order to refresh the master secret, for instance, while the end user (UAD) is not waiting for a server (e.g. SEA) response, and hence, the latency incurred will not be noticeable. In some examples, a client may invoke preemptive authentication after every session resumption operation when other operations have completed and the connection is idle. In other examples, a client may also or otherwise refresh authentication as dictated by local policy, e.g. when the client application recognizes that the master secret is close to expiry. In yet other embodiments, a client may refresh authentication as prompted by a server (e.g. SEA instance). For example, a server may indicate during a session resumption operation that a refresh is needed (e.g. due to the master secret being close to expiry).

In the particular example of FIG. 9, STSM-2 is pre-emptively established at 936 such that, upon expiry of STSM-1 at 938, the device 902 is already prepared for subsequent renewals using the new master key. Namely, upon expiry of STSA-2 at 940, the session may be efficiently renewed via symmetric key processing at 942 using STSM-2.

Naturally, upon expiry of a STSM key without prior pre-emptive establishment of a new STSM (e.g. upon the user/device leaving the system for a prolong period of time), a subsequent session will be initiated by repeating the steps of the process 900 starting at public key authentication at 910.

While the above example describes the implementation and processing of pre-emptive renewal of a short-term symmetric master key within the context of a user authentication system operable for the purposes, in some examples, of authenticating a user presence, such pre-emptive renewal protocols may also or alternatively be implemented within the context of other applications that do not necessarily involve authenticated user presence. Namely, while STSM key and STSA key implementation and processing protocols are discussed herein within a common example, these protocols may be independently considered in different and independent applications. Namely, the use of pre-emptively renewed STSM keys for session resumption applications may be considered independently of any type of user presence authentication, advertising and/or tracking. These or other such considerations will be readily understood by the skilled artisan.

Furthermore, FIGS. 7, 8 and 9 include sequence diagrams that are useful for clarifying the actions and actors as they participate in the noted protocol(s). In at least one of the various embodiments, the device referred to in the sequence diagrams may be a biometric device such as biometric devices 402, 502 or 512 as described below. Likewise, access point resources may include, but are not limited to, computers, applications, mobile devices, or the like, that are enabled to interface with one or more authentication devices in accordance with at least one of the various embodiments.

Illustrative Operating Environment

FIG. 1 shows components, in accordance with one illustrative embodiment, of an environment in which embodiments may be practiced. Not all of the components may be required to practice different embodiments, and variations in the arrangement and type of the components may be made without departing from the general spirit or scope of the present disclosure. As shown, system 100 of FIG. 1 includes local area networks (LANs)/wide area networks (WANs)-(network) 110, wireless network 108, client computers 102-105, authentication/access authorization device 106 (generally referred to herein as authentication device 106, which may include, but is not limited to, a mobile, wireless, portable, wearable device and/or the like, for example), authentication/access authorization server computer 116 (generally referred to herein as authentication server 116), or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a server, client application, media player, mobile telephone, game console, desktop computer, access point, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

One embodiment of Client computers 102-105 are described in more detail below in conjunction with FIG. 2. Briefly, however, Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or another device identifier. Such information may be provided in a network packet, or the like, sent between other client computers, server computer 116, device 106, or other computers.

Client computers 102-105 may further be configured to include a client application that enables an end-user to log into an end-user account that may be managed by another computer, such as server computer 116, or the like. Such an end-user account, in one non-limiting example, may be configured to enable the end-user to manage one or more online activities, including in one non-limiting example, project management, system administration, configuration management, search activities, social networking activities, browse various websites, communicate with other users, or the like.

One embodiment of device 106 is described in more detail below in conjunction with FIG. 4. Briefly, however, device 106 can be any device that can be worn or otherwise carried by a user and is capable of obtaining authentication data to invoke an authentication process, in this illustrated example, via server 116. As introduced above and as will be detailed below in accordance with some embodiments, authentication data may include manually entered data and/or biometric data acquired or otherwise input by the user to seek authentication and, in some implementations, certain access authorizations.

As noted above, some embodiments of device 106 will further include one or more physiological sensors, proximity, behaviour, and/or activity detection mechanisms to provide secondary authentication and/or authorization measures to gain and/or maintain authentication/authorization in use.

Non-limiting examples of suitable wearable authentication devices may include, but are not limited to, a wristband, wristwatch, bracelet, necklace, ring, belt, glasses, clothing, hat, anklet, headband, chest harness, patch, skin probe or earring(s), to name a few, or any other wearable item that is capable of obtaining a biometric signal. The device 106 can also be incorporated into clothing. In another embodiment, the device 106 may comprise more than one biometric and/or physiological sensors, to be used alone and/or in combination, to carry out user authentication and/or liver user presence confirmation. Device 106 may be arranged to communicate with one or more of client computer 102-105 over a network, such as wireless network 108. Further, device 106 may be arranged to communicate with access points, enabling user access to secure locations and secured electronic devices as well as customization of a user experience.

As will be appreciated by the skilled artisan, some of the features and/or functions noted above with respect to client computers 102-105 may be interchangeably applied to the functions and features of the herein described embodiments of portable device 106. For instance, while client computers are distinctly illustrated herein in one particular embodiment, some embodiments may further or alternatively contemplate portable and/or wearable client computers, as can other embodiments be considered to implement the features and functions of their herein described embodiments.

Wireless network 108 is configured to couple client computers 102-105 and/or authentication device 106 with network 110. Wireless network 108 may include any of a variety of wireless sub-networks that may further overlay stand-alone ad-hoc networks, and the like, to provide an infrastructure-oriented connection for client computers 102-105 and/or authentication device 106. Such sub-networks may include mesh networks, Bluetooth, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Bluetooth, Wireless Router (WR) mesh, and the like. Access technologies such as 2G, 3G, 4G, 5G, and future access networks may enable wide area coverage for mobile computers, such as client computers 102-105, and authentication device 106 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 102-105, authentication device 106, and another computer, network, a cloud-based network, a cloud instance, or the like.

Network 110 is configured to couple network computers with other computers, including, authentication server computer 116, client computers 102-105, authentication device 106 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of authentication server computer 116 is described in more detail below in conjunction with FIG. 3. Briefly, however, authentication server computer 116 includes virtually any network computer capable of performing actions for storing, authenticating, processing of biometric information, users, access points, or the like.

Although FIG. 1 illustrates authentication server computer 116 as a single computer, the innovations and/or embodiments are not so limited. For example, one or more functions of authentication server computer 116 may be distributed across one or more distinct network computers. Moreover, authentication server computer 116 is not limited to a particular configuration such as the one shown in FIG. 1. Thus, in one embodiment, authentication server computer 116 may be implemented using a plurality of network computers and/or client computer. In other embodiments, development computer may operate as a plurality of network computers within a cluster architecture, a peer-to-peer architecture, cloud or virtualized architecture, or the like. Further, in at least one of the various embodiments, authentication server computer 116 may be implemented using one or more cloud instances in one or more cloud networks.

Described herein, in accordance with some embodiments, is a system, method and device that authenticates a user through activity monitoring while confirming that the user being authenticated is a genuine living human being. This system may also, or alternatively, seek to confirm a live user presence during authenticated/authorized usage, confirm proximity of such user to a given access point or associated resource during use (i.e. within a designated authorization zone, area or distance threshold), and/or evaluate other secondary user authorization parameters. In the herein illustrated embodiment, the system is centred around a wearable authentication device that authenticates the wearer based on available authentication data, which may include biometric data, while confirming, based on an acquired physiological signal, that the wearer is in fact a living human being. Some embodiments further allow for confirmation that the same user (i.e. the wearer) is both the source of the physiological signal and the authentication data, for instance, within the context of biometric authentication. In yet other embodiments, such live user presence, proximity and/or other related provisions may not be implemented, for instance, in reduced security environments and/or to reduce or limit complexity of the implemented authentication devices/systems.

In one embodiment, once authenticated, the wearable authentication device synchronizes with a pre-initialized authorized registration application to authorize the wearable authentication device to wirelessly communicate a pre-authenticated user identity to other devices and systems. In another embodiment, once authenticated, the wearable authentication device activates and privately broadcasts the user's identification to other devices and systems. In yet other embodiments, authentication and/or physiological data is communicated or otherwise transferred to a trusted computation device, such as authentication server 116, for remote processing, thereby reducing a computational load on the wearable device. This enables logical and physical access by the user at one or more access points as a result of a single user authorization.

In contrast, traditional access systems, including biometric access systems, may be subject to hacking and/or misuse. For example, hackers may lift a fingerprint and create a fingerprint mold, which can be applied to a fingerprint sensor, in order to gain access. Hackers may also take a picture of a fingerprint, and hold it in front of a scanner. Similarly, a user of an authentication device that authenticates once, and then pre-authorizes access for a defined period of time, may be worn by a person without authorization while a person with authorization authenticates the device. Other drawbacks naturally exist, such as maintaining authorized access activations when a user removes the authentication device and/or leaves or moves away from the restricted access area or resource. Such possibilities may be unacceptable to security-conscious institutions, resulting in additional layers of security being added, e.g. re-occurring user authentication, or using out of band mechanisms. The herein-described embodiments provide a compelling security solution to at least some of these typical drawbacks by significantly reducing if not eliminating concerns about hacking and misuse of an authentication/authorization device. For example, in one illustrative embodiment where a biometric authentication sensor, such as a fingerprint reader, shares a contact point with a complementary physiological sensor, such as an ECG, even if a hacker were to lift a fingerprint, create a fingerprint mold, and attach or otherwise embed the fingerprint mold onto a glove while touching biometric authentication sensor, an analysis of an activity and/or physiological sensor would determine that the user is not an authenticated live, in-the-flesh, human being, and so the authentication device would not authenticate the user. Furthermore, following from the same illustrative example, misuse of the authentication device, e.g. authenticating a device worn by another individual, is also prevented, as the activity sensor could be configured to cease authentication and/or de-authenticate a UAD and/or user upon identification of a mismatch between activity metrics and a predetermined authenticated profile. A physiological sensor could alternatively or additionally be configured to fail to take a reading unless the device was both worn and authenticated by the same user (e.g. an electrocardiogram or galvanic skin response does not exist across two people). Accordingly, the authentication device would not authenticate, even if the biometric feature (e.g. a fingerprint) is a match. In addition, at least some of the presently described embodiments allow for faster access control since the user does not require authentication every time she needs to access a physical or logical system. As noted above, other features, advantages and benefits of the herein described embodiments, such as authorised user confirmation during and/or post-authentication, user proximity metrics, and/or other such features and advantages, will be readily apparent to the skilled artisan from the present disclosure.

The security of a range of environments (e.g. workplaces) with corresponding unique sets of environmental features may be improved via the employment of various embodiments of this disclosure. That is, distinguishable environmental and/or user behavioural features can be used to determine a wearable device's location, and consequently the device's usage profile, which can be created and/or analysed computationally. Various use cases of an activity authentication method, device, or system, in accordance with various aspects of the disclosure, will now be described with reference to non-limiting examples of clean labs, clean equipment manufacturing, food and beverage manufacturing, and data centres, in order to provide exemplary situations, sensors, and environmental and/or activity data that may be addressed within the scope of the disclosure. Such description is provided as example only, and are not intended to limit the range of applications that may be addressed within the scope of the systems and methods herein disclosed. Examples of clean labs in which various aspects of the disclosure may be implemented may include, but are not limited to, pharmaceutical or chemical manufacturing centres, biotechnology research and/or development facilities, medical diagnostic settings, and the like. Such environments typically have controlled temperatures, pressures, and/or humidity (e.g. 16° C.-19° C., positive pressures, and ~50% relative humidity, or RH, respectively). As such, temperature, pressure, and/or humidity sensors on a wearable device or UAD may register environmental cues to signal when a user enters or leaves a clean room. Such data and/or entry/exit information may also be used to create and/or update a user's clean room usage profile, in accordance with various embodiments.

Furthermore, clean labs may also typically comprise a closed physical space exhibiting stable equipment RF signals, which may be detected by an RF sensor on a UAD and processed to indicate entry/exit of a clean room. Similarly, an ambient light sensor may detect for on-board processing of an ambient light uniformity (or lack thereof). In clean lab environments with a consistent number of users, for instance, those in which there are a limited number of people inside at any given time due to limited space, unique interpersonal interactions or unique interactions between wearable devices may be detected and processed to assess environment and user behaviour.

In addition to distinguishable environmental parameters, clean labs may typically provide constraints that limit user physiological or behavioural features which can be used to authenticate a user or activity. For instance, clean labs typically require protective clothing, which may constrain user motions due to the presence of gowns, boots, gloves, and the like. As such, a motion sensor on a wearable device may sense and/or recognise unique motion profiles consistent with constrained motions. Similarly, work in a clean room space may be limited to a select set of activities, which may be recognised and logged by a wearable device, and/or allow for user recognition via an on-board IMU to determine if, for instance, a user activity merits authorised access to a clean room resource.

Clean equipment manufacturing settings in which various aspects of the disclosure may be implemented may include, but are not limited to, manufacturing centres for medical devices, precise optics (e.g. for medical diagnostic, lenses, etc.), aviation equipment, and the like. Such environments typically comprise large spaces, wherein workplace users may travel and/or walk significant distances. Such motion may be detected on board a UAD via motion sensors, GPS trackers, step counters, or the like, to be processed and/or analysed to determine if user motion is consistent with an authorised activity.

Furthermore, equipment manufacturing centres may also typically comprise a significant amount of metal and/or steel equipment, which may prompt unique RF signal patterns due to multiple reflections. Such patterns may provide signatures to which signals sensed by a UAD may be matched against. Similarly, unique sound profiles based on a location with respect to various equipment may provide an audio-based profile that may be detected and/or recorded via an on-board microphone. Users of clean room manufacturing centres may also perform unique movements that correspond to the operation of specific equipment, which may be detected by, for instance, IMUs, on board a UAD.

Other exemplary environments in which the systems and methods described herein address security and authentication needs are manufacturing centres of food and drink. Such settings typically have controlled temperatures and unique sound profiles due to a location with respect to specific equipment, which can be detected by on-board sensors and processed by a UAD. Furthermore, the presence of protective clothing and a limited set of authorised activities may provide unique motion profiles and enable activity recognition and logging via an IMU sensor, as described above.

Data centres may similarly have unique environmental features, such as long aisles that provide distinct RF signatures to be recorded and analysed by a UAD worn by a user. Furthermore, the large amount of computing and cooling equipment in such settings may provide distinct ambient sound profiles for environmental identification and activity authentication. The significant amount of walking in straight lines that a user would perform in such an environment, or the act of riding, for instance, a scooter, or pushing carts laden with equipment, may also provide physiological and/or behavioural features that could be employed to authenticate a user and/or user activity.

In various embodiments, any one or more environmental and/or activity features may be monitored to authenticate a user in a particular setting. While some features may provide highly specific and unique profiles for identification, some may comprise more general (i.e. less unique) characteristics, and may optionally be used in conjunction with any number of other parameters to determine if sufficient activity-related criteria (e.g. behavioural and/or environmental data) are met (or not met) to authenticate (or not authenticate) a user. In various embodiments, different parameters may be assigned relative weights when an authentication decision is made. Similarly, a lack of meeting certain parameters may not result in immediate de-authentication of a user, but may serve as "red flags", the accumulation of a designated number of which, or combination thereof, may, in accordance with some embodiments, result in determining that authentication is not warranted for a particular user or activity in a particular setting/environment.

For instance, if a user of a clean room exhibits movement that appears unhindered by protective clothing as measured by, for example, an IMU, the UAD may maintain an authenticated status if a designated number of other parameters are in agreement with an authenticated profile stored on board the device. However, if such movement patterns are determined to be, for instance, from a user that is shorter in height than the authenticated user, access may be immediately revoked, despite an on-board assessment that all environmental parameters are in agreement with an authorised profile.

In some embodiments, an authenticated activity may require that a user, regardless of identity, meet certain activity-related criteria. For instance, cleanroom settings may require that a user be gowned. Identification of activity-related data indicative of an ungowned user may therefore result in immediate revocation of authentication for a user. On the other hand, a requirement, in accordance with yet other embodiments, may be that any user may be authorised to access a controlled resource, as long as activity-related data indicate that the user is, for instance, gowned.

In yet other embodiments, an authenticated activity may be related to environmental data, and biometric and/or physiological data may be peripheral to authenticating a user. For example, a user may contribute an ECG signal which is then compared to that of any live user (i.e. a user-agnostic ECG signal), while environmental parameters, such as a specific combination and relative strengths of respective electronic device ID signals, may indicate that a user is in a designated environment. In this example, and in accordance with various embodiments, the user may be granted access to a resource. Similarly, even if a specific ECG is matched to a specific user to within a designated tolerance, but an ambient humidity does not match that anticipated for, for instance, a wine cellar, then a user may not be granted access to a resource within a wine cellar.

In yet other embodiments, an activity template may reflect or incorporate data related to a sequence of activities that are to be performed in order, whereby failure to complete an earlier activity in order can pre-empt access to a downstream activity or resource. In a simplified example, an activity template may include template data representative of a sequence of four activities: (1) washing hands, (2) putting gloves on, (3) gowning, (4) operating an equipment in a clean-room. This sequence may, in some embodiments, be considered as a single authorized activity. In this scenario, if a user does not wash their hands then they break the sequence and many not fit the activity-sequence template, thus failing to ultimately gain downstream operative access to the clean-room equipment.

Illustrative Client Computer

Figure 2:
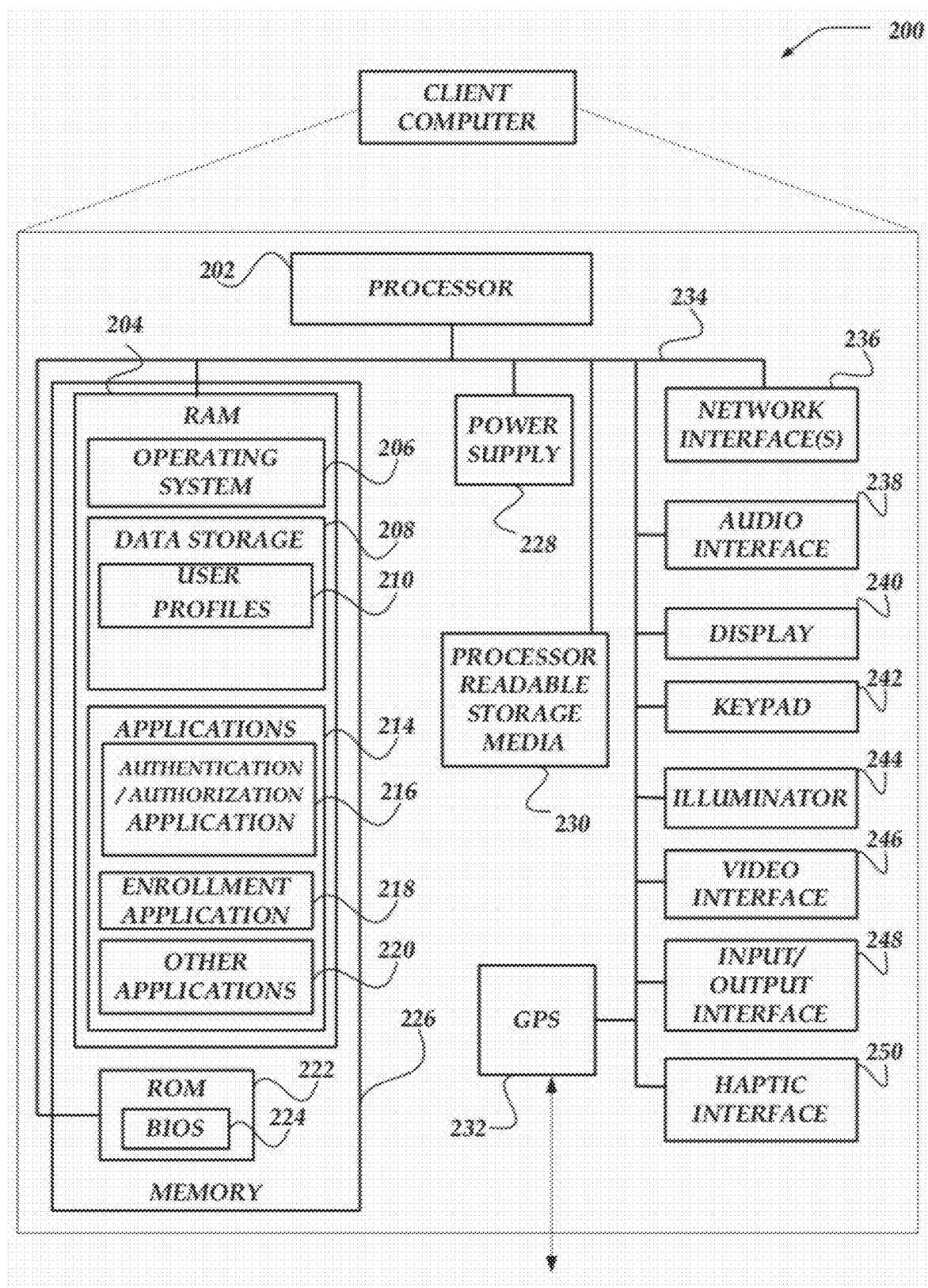
FIG. 2 is a diagram of an exemplary client computer that may be included in a system in accordance with at least one of the various embodiments.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing different embodiments of the disclosure. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery, or directly powering the unit.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra-wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (MC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, AMO-LED, PMOLED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, ultrasound, WiFi, ultra-wideband, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™ Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200. Further, at least a portion of data storage 208 may be used to store user (e.g. authentication, authorization and/or biometric) profile information 210 for one or more users and/or one or more authentication devices.

Processor readable storage media 230 may include volatile, non-transitive, non-transitory, non-volatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, user (e.g. biometric) authentication application 216, enrolment application 218, other applications 220, or the like.

Other applications 220 may include a web browser. The web browser may include virtually any application configured to receive and display graphics, text, multimedia, messages, and the like, employing virtually any web-based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, the browser may enable a user of client computer 200 to communicate with another network computer, such as authentication server computer 116 as shown in FIG. 1.

Other applications 220 may additionally include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
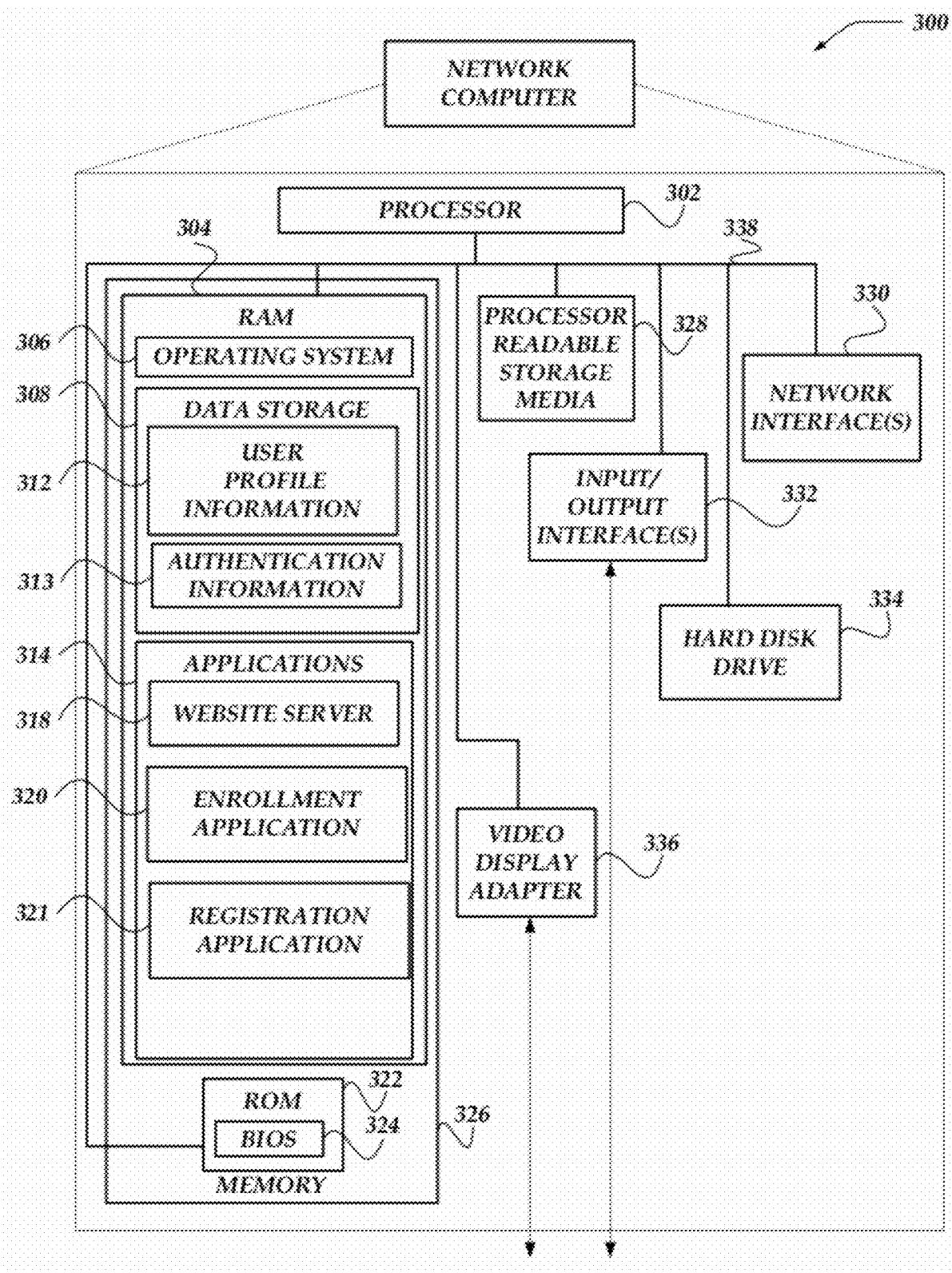
FIG. 3 is a diagram of an exemplary network computer that may be included in a system in accordance with at least one of the various embodiments.

FIG. 3 shows one embodiment of a network computer 300, according to one embodiment. Network computer 300 may include many more or less components than those shown. The components shown, however, are sufficient to disclose an illustrative embodiment. Network computer 300 may be configured to operate as a server, client, peer, a host, cloud instance, or any other computer. Network computer 300 may represent, for example authentication server computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, non-volatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include user (e.g. authentication, authorization and/or biometric) profile information 312. In at least one of the various embodiments, user profile information 312 may include information, such as, one or more files, that include authentication (e.g. biometric) data for one or more users, or the like, used for authentications of wearable authentication devices. Also, in at least one of the various embodiments, data storage 308 may include authentication information 313 that may include information about users, access points, access control lists, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM messsage servers, email servers, account managers, and so forth. Applications 314 may also include, enrolment application 320 for enrolling and/or activating authentication devices. Application mat also include registration application 321 for authenticating users by employing biometric information, authentication devices, additional conditions, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Authentication Device

In at least one of the various embodiments, a wearable authentication device, such as, authentication device 106 may be any device that may be employed, typically, worn or held, by a user and is capable of receiving authentication data as input, such as for example, offering a user input interface for the manual input of authentication data (username, password, code, PIN, etc.) and/or being operable to obtain a biometric signal or like input. Non-limiting examples of wearable authentication devices are a wristband, wristwatch, bracelet, necklace, ring, belt, glasses, clothing, hat, anklet, headband, chest harness or earring(s), or, in the context of a biometric device, any other item that is capable of obtaining a biometric signal. The wearable authentication device can also be incorporated into clothing. In another embodiment, the wearable authentication device may comprise multiple input interfaces so to access distinct authentication inputs (e.g. combined manual and biometric inputs, multiple biometric inputs, etc.).

While wearable authentication devices are contemplated in the illustrated embodiments, for at least one of the various embodiments, authentication devices within the scope of these innovations are not limited exclusively to wearable devices. In at least one of the various embodiments, authentication devices in non-wearable form factors may be considered to be within the scope of the innovations described herein. For example, a fixed authentication device embedded in a chair, desk, handle bar, or the like, or combination thereof. Likewise, authentication devices that may be held rather than worn are also contemplated to be within the scope of the innovations described herein. However, in the interest of clarity and brevity most of the discussion and examples presented herein are described in terms of wearable authentication devices. One of ordinary skill in the art will appreciate the other authentication device form factors are within the scope of these innovations and are envisaged.

In at least one of the various embodiments, a user of a wearable authentication device may be authenticated with one or more biometric technologies or sensors that may capture biometric signals and/or data that represent biometric features that may be employed to uniquely identify the user. The uniqueness of a biometric feature may be directly related to the underlying inter-individual differences in a population. Some non-limiting examples of biometric data that may be employed to uniquely identify a user are gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers, skin-color variation or discoloration, or perspiration. In at least one of the various embodiments, authentication is performed by the authentication device. However, additionally or alternatively, authentication may be performed by an authorized registration application.

In at least one of the various embodiments, a physiological feature is also captured, not to identify a user (although this is also contemplated, with various degrees of weight given based on the uniqueness of the physiological signal for use as a secondary biometric feature type), but to determine whether the authentication data was received from a genuine living human being, and/or to determine whether the genuine living human from whom the authentication data was captured is wearing the authentication device. Similarly, various activity cues as discussed above, such as motion profiles or environmental characteristics as sensed by a UAD, may be given various weights based on, for instance, context or activity, and need not necessarily be so unique as to specifically identify a user, but may in some embodiments serve as general indicators when authenticating a user.

For example, in some embodiments, an authentication process invoked by or via the device will be satisfied upon confirming authentication of the input authentication data and concurrent live user presence via the device's physiological feature. Such live user presence confirmation may further or alternatively persist during use to confirm live user presence in maintaining user authorizations and otherwise revoke such authorizations if the physiological input is lost (e.g. if the device is removed from the user, or, vice-versa). Similarly, persisting activity monitoring may be employed to maintain authorisation.

In some embodiments, as noted above, the user authentication interface and physiological sensor will be configured so to concurrently with the user during authentication, for example, where authentication data input requires user contact (e.g. fingerprint and/or data input) and where such contact invariably results in user contact with a complementary physiological sensor (e.g. probe, interface and/or contact thereof). It will, however, be appreciated that such concurrent user contact need not necessarily proceed through a common interface but rather, may require authentication and physiological interfaces to be closely disposed or arranged to facilitate concurrent or sequential contact. In some embodiments, a physiological signal may further require two concurrent physical contact points by a same genuine user, for example in the context of an ECG, which can be achieved in some embodiments, through a finger input interface and wrist interface in a wristband or likewise configured device.

For example, because an electrocardiogram requires two points of contact across the heart to be detected, an electrocardiogram (ECG) is used in at least one of the various embodiments to validate that a fingerprint (e.g. authenticating biometric data) is being captured by a wearer of an authentication device (e.g. as opposed to a fingerprint from a person standing next to the wearer). The ECG may also be used to defeat a replay attack by validating that the fingerprint is captured from a genuine living person, as opposed to a fingerprint mold intended to fool the authentication device. Both validations are accomplished by positioning one of the ECG sensors proximate to (e.g. adjacent to, on top of, around the bezel of, as part of, etc.) the fingerprint sensor, such that, in one embodiment, both biometric and physiological features are captured concurrently, from the same finger. Additionally, or alternatively, authentication and physiological features may be captured sequentially, such that within a defined period of time chosen to prevent another person from substituting their finger, or in parallel. Additionally, or alternatively, authentication and physiological features may be captured within a defined period of time such that the wearable authentication device has not detected the removal of the finger between captures. It will be appreciated that while biometric authentication is considered in the above-noted examples, other authentication mechanisms may also be considered to concurrently or sequentially benefit from physiological user presence confirmation. For instance, a user input interface for receiving as input manually entered authentication data (e.g. touch sensitive screen or interface) may double as or be juxtaposed to a physiological probe so to provide a similar effect.

Following from the above example, in one or more of the various embodiments, a second ECG sensor is positioned so as to contact the wrist of the wearer. In this way, an ECG signal is enabled to travel from the heart, through one arm, through one of the ECG sensors, out the other ECG sensor, through the other arm, and back to the heart. Without this electrical connection—e.g. if another person is providing the fingerprint or manual input, such that the ECG does not flow through the finger path of the user touching the authentication interface—the authentication device will determine that the authentication data is not being provided by the wearer of the authentication device. Similarly, if the electrical connection is distorted or in any way modified by the use of a fingerprint mold, for example, the ECG sensor will determine that the fingerprint is not being provided by the wearer of the authentication device.

Throughout this disclosure, and particularly with reference to the illustrative example presented above, for clarity and brevity, authentication features are predominantly discussed as biometric features, and more predominantly fingerprints, and physiological features are predominantly discussed as ECGs, but other types of authentication, and particularly biometric features may be considered, such as but not limited to finger-veins and galvanic skin responses, to name a few. For instance, in the context of the illustrative example provided above, biometric authentication feature may be any feature that is captured based on contact with the user, whereas a physiological feature may be any feature that can be captured, at least in part, using the same body part as is used to capture the biometric feature, and which can determine if the wearable authentication device is worn by the owner of that same body part. While fingerprint and ECG are discussed in greater detail below as options for providing authentication and liver user presence confirmation, such examples should not be considered to limit the general scope and nature of the present disclosure, but rather, merely serve as one example consistent with various embodiments of the present disclosure.

In at least one of the various embodiments, the wearable authentication device may include an onboard power source to enable the authentication device to perform the required functions, such as obtaining the authentication and/or physiological signals, transmitting and receiving these and related control signals, and in some embodiments, maintaining a detector for detecting the removal of the wearable authentication device, for example, such as an electronic continuity detector. Any power source known to the skilled person is acceptable, with non-limiting examples being battery, photovoltaic, kinetic, or microgenerator, thermal, piezo-electric generator, inductive charging, and wireless power transfer.

The wearable authentication device includes one or more radios/transceivers for transmitting and receiving communications. The one or more radios/transceivers may transmit and receive communications from systems installed at access points, e.g. transmitting authorization to gain access to one or more access points.

In one example, the wearable authentication device may incorporate a wireless connectivity module such as Bluetooth 4.0 Low Energy (BLE), Near-Field Communications (NFC), WiFi, or other wireless technology capable of transmitting and receiving functions. In one embodiment, a BLE radio may be used because it may consume significantly less power when communicating in short bursts. In this way, a battery or other power source used to power the wearable authentication device may have an extended life, in some cases on the order of multiple weeks.

In at least one of the various embodiments, the radios and/or transceivers may be used to transmit data during initialization and authentication, identify the user, and to establish a unique user profile associated with the user and the wearable authentication device. The same or other the radios and/or transceivers included in a wearable authentication device may also transmit and receive motion data, time of flight, signal strength, and proximity data in order to be aware of local access points and/or identify a user activity. In at least one of the various embodiments, the radios and/or transceivers may also be used to receive a positive authentication message that puts the wearable device into an authenticated state, as well as to prompt the user of notification events.

In at least one of the various embodiments, the wearable authentication device may be arranged to include proximity sensors for sensing an access point (physical or logical), or an authorized application. In one embodiment, a feature of the Bluetooth 4.0 standard which may be used by radios and/or transceivers included in the authentication device. Also, in at least one of the various embodiments, the wearable authentication device may be configured to transmit a beacon signal along with the transmitting signal strength. Accordingly, the receiving device may use this information, along with the received signal strength, to estimate the proximity of the wearable authentication device. Non-limiting exemplary uses of the proximity data may include: only unlocking a device when the proximity is within a specified range, i.e., a door lock is only unlocked when the authorized user is within a certain distance, such as 50 cm; a "digital leash" which warns the user when a paired device is no longer within a certain proximity; revoke authorized access to a given resource upon the device moving beyond a designated authorization distance, zone or area, or the like.

In at least one of the various embodiments, in addition to being used to confirm that the person providing the fingerprint is wearing the wearable authentication device, as described above in one example, the wearable authentication device may utilize ECG biometric authentication as a secondary, confirmatory form of biometric authentication in addition to the primary authentication mechanism, e.g. fingerprint, finger-vein, etc. In at least one of the various embodiments, ECG biometric authentication technology may use unique features of a user's electrocardiogram (ECG) to create a highly personalized biometric signature for that individual. Like other biometric characteristics, the ECG is universal, unique for every individual, and permanent over time. An ECG may be recorded for every living user, with no exclusion criteria. In addition, studies have shown that even though aspects of the ECG signal may get distorted with time and aging, the overall diacritical characteristics are observable. In the case of ECG, the uniqueness of the biometric feature is a result of several parameters of the cardiac function that control the waveforms. Electrophysiological variations of the myocardium such as the heart mass orientation and exact position, or the timing of depolarization and repolarization add to the idiosyncratic properties of every person's ECG waveforms.

In at least one of the various embodiments, one or more well-known ECG biometrics algorithms may analyze the overall pattern of the signal waveform rather than specific characteristics of the heart-beats and are therefore referred to as "fiducial-independent". One of the core algorithms is referred to as the AC/LDA (Autocorrelation/Linear Discriminant Analysis) and has become a standard for the comparison of fiducial dependent and independent algorithms.

In at least one of the various embodiments, a number of mechanisms for initiation of ECG capture and authentication may be used. For example, the authentication device may be arranged to automatically sense when a top electrode is touched, such as using an embedded "lead on/off" detection system, optionally with notification of the lead status to the user. Additionally, or alternatively, ECG capture is initiated in response to capturing primary authentication data, such as a fingerprint.

In at least one of the various embodiments, when biometric authentication is initiated through fingerprint, one or more images of a finger are captured and stored in a biometric profile 210. In one or more of the various embodiments, when authentication is performed by the registration application, the one or more images of the finger are transmitted to the registration application for processing and stored in biometric profile information 312. Similarly, once ECG capture and liveness validation are initiated, the single-channel filtered ECG data may be processed by the wearable authentication device and/or transmitted to the registration application for processing. In another embodiment, the images of the finger and ECG capture and liveness validation are processed and stored on the device.

Using a function within the registration application, biometric/user enrolment may be initiated, wherein the user touches the wearable authentication device, and then a biometric feature (e.g. a fingerprint, finger-vein) and an ECG are captured and processed by the wearable authentication device, and/or are transmitted to the registration application. This process may take as little as about 1 second and up to a few seconds, a minute, or a few minutes depending on the level of interaction with the user with the wearable authentication device and the type of authentication signals being obtained.

In at least one of the various embodiments, the user (e.g. biometric) profile may be created in a number of different ways. In one way, the biometric signal may be transmitted to a cloud service, where the processing is performed on the cloud servers to generate the biometric profile. Alternatively, the biometric signal may be processed on the registration application to generate the biometric profile.

In at least one of the various embodiments, once the biometric profile is created, it may be associated with a user and stored within a cloud service. Also, in at least one of the various embodiments, the biometric profile may be transmitted to the registration application or stored locally just on the device. In at least one of the various embodiments, the biometric profile may be stored on a wearable authentication device that is arranged to include the processing power required to authenticate the user. In another alternative, the processing for the creation of the biometric profile may be performed on the registration application or in the wearable authentication device itself.

In at least one of the various embodiments, the wearable authentication device may include one or more of: a CPU or system on a chip (SOC) which acts as the controller, a wireless transceiver, an antenna, audible and haptic feedback, and a user interface. The controller may be operative for controlling the overall operation of the wearable authentication device. The controller functionality may be implemented within, for example, one or more digital processing devices within the wearable authentication device. The wireless transceiver is operative for supporting wireless communication between the wearable authentication device and one or more other wireless entities including the AAD and wireless access points. In one embodiment, separate transceivers are provided within the wearable authentication device to support wireless communication between the wearable authentication device and other systems or devices. The wireless transceiver may also be coupled to one or more antennas to facilitate the transmission and reception of wireless signals. Any type of antenna(s) may be used including, for example, a dipole antenna, a patch antenna, a helical antenna, an antenna array, trace antenna, and/or others, including combinations of the above.

In at least one of the various embodiments, a user interface may be operative for providing an interface between a user and the wearable authentication device. The user interface of a authentication device may include structures such as, for example, a keyboard, a liquid crystal display (LCD), light emitting diode (LED), active-matrix organic light-emitting diode (AMOLED), passive-matrix organic light-emitting diode (PMOLED), capacitive touch screen, a speaker, a microphone, mouse, stylus, one or more physical or electronic buttons, and/or any other form of device or structure that enables a user to input information or commands to the wearable authentication device or receive information or a notification from the device.

In one embodiment, the controller may first determine if the wearable authentication device (and, therefore, the user) is within a predetermined distance or proximity to an access point. In one example, if the wearable authentication device is within proximity of an access point and the wearable authentication device transmits a control signal to the access point indicating that the user has been authenticated, the receiver at the access point may automatically enable access to the user. If the wearable authentication device later goes outside the predetermined distance from the access point, the access point may be locked. In one example, if the access point is a security protected desktop computer and the preauthorized user wearing their preauthorized wearable authentication device temporarily leaves her desk to go to lunch, the computer will automatically lock so that no one else may use it in the user's absence. Similarly, if the access point is a smartphone and the smartphone is inadvertently left somewhere by the user, or is stolen, the smartphone will automatically lock up and thus be unusable by an unauthorized party in possession thereof. When the user wearing the preauthorized wearable authentication device again comes within a predetermined distance of the smartphone, the smartphone will simply be unlocked without having to repeat the automatic log in procedure, assuming that the wearable authentication device remains preauthorized.

In at least one of the various embodiments, the wearable authentication device, no matter which type of authentication data is used for authentication, should be able to maintain contact with the user (e.g. via onboard physiological sensor) such that in the case that the wearable device is removed from the user, the wearable device will require re-initialization prior to authorizing access control. The purpose of maintaining contact of the wearable authentication device with the user is to ensure that an authorized authentication device cannot be transferred to a different user without requiring reauthorization. Accordingly, although skin or body contact is not required at all times while the wearable device is in its authenticated state, the wearable device should be on the user in such a way that removal of the wearable will put the wearable device back to its unauthenticated state. In the unauthenticated state, the wearable authentication device is not enabled to transmit a control signal to an access point. The security of at least some of the herein described embodiments depends on ensuring that removal of the wearable device from the user is reliably detected. Accordingly, the wearable authentication device may be arranged such that removal from the user's body may be easily detected.

In one particular embodiment, as a complement to or in the absence of a physiological sensor, the wearable device may comprise a sensored adjustable and/or openable clasp to assist the user with putting on and removing the wearable device while monitoring removal of the device form the user in authenticated use. For example, removal of the wearable device may be sensed by the wearable authentication device, for example, by opening the clasp, or again by cutting the band, or generally severing an electrical conduit such as an electronic continuity detector. One exemplary electronic continuity detector that may be used to detect device removal comprises a simple circuit within the wearable device that runs around the entire wrist and is broken when the clasp is opened or the band is cut. Other types of device removal detection may be used, for example, including disruption in skin contact detection by way of conductivity, heat flux, galvanic skin response or motion, or periodic or continuous biometric signal detection. Yet other non-limiting examples of device removal detection embodiments may include pulse detection, skin temperature detection, ambient temperature detection, blood flow detection, pressure detection, ambient light detection, electromagnetic field detection, respiration detection, heart rate detection, electrocardiogram detection, photoplethysmogram detection, electromyogram detection, electroencephalogram detection, near infra-red detection, skin-color detection, close magnetic contact detection, and mechanical switch detection.

In at least one of the various embodiments, additional sensors may be incorporated into the device to obtain additional biometric, activity, or environmental readings. Some non-limiting examples of an additional sensor are motion sensor, proximity sensor, barometric sensor, pressure sensor, thermometer, microphone, near infrared sensor, light sensor, GPS sensor, capacitive sensor, gyroscope, manometer, camera, humidity sensor, hall sensor, galvanic skin sensor, photoplethysmogram sensor, electroencephalogram sensor, electromyogram sensor, blood flow sensor, bio-impedance sensor, otoacoustic emission sensor, optical sensor, altimeter sensor, acoustic sensor, ambient light sensor, or UV light sensor. These additional sensors may provide one or more contextual signals such as the location of the wearable device and/or proximity to trusted environments.

In at least one of the various embodiments, a wearable authentication device may comprise one or more motion sensors that may be used for a variety of purposes, including but not limited to, user input (e.g., tap detection), activity tracking (e.g., pedometer, sports, fitness, etc.), gesture recognition, or the like. In one embodiment, a wearable authentication device may incorporate a six-axis motion sensor using an integrated accelerometer and gyroscope or a 9-axis motion sensor using integrated accelerometer, gyroscope, and magnetometer application-specific integrated circuit (ASIC). Embedded motion sensors may also be utilized for simple gesture recognition to indicate user intent, such as for example gestures may be used to distinguish between user intents to unlocking different locks on an automobile, such as, the driver door, passenger door, the trunk, or the like. In this way, computational requirements on the wearable authentication device may be kept at a minimum.

In at least one of the various embodiments, the wearable authentication device may be arranged to include notification devices and procedures to alert the user of one or more notification events. Some non-limiting examples of these include one or more notification LEDs and/or a vibration motor. A notification event may be an event detected by the wearable authentication device that the user should be aware of. These events may include: when the wearable device has been put into an authenticated state; when the wearable authentication device is communicating with other devices; when the wearable device is sensing motion; and/or when some event has occurred on a paired device, such as receiving an email or text. A paired device may be any device or system that interacts with the wearable authentication device.

In at least one of the various embodiments, the wearable device may also comprise other components such as a display screen, input devices (such as, for example, button, switch, keypad or touchscreen), timepiece/timers, tracking or global positioning (GPS) detector activity, or physiology or emotion tracking. In at least one of the various embodiments, authentication device may be arranged to indicate proximity to other devices. In at least one of the various embodiments, wearable authentication devices may be arranged to include additional electronics for storing data for access and use not related to the presently described security system.

FIG. 4A and FIG. 4B are schematic physical and logical diagrams, respectively, of a wearable user authentication/access authorization device, in accordance with at least one of the various embodiments.

FIG. 4A illustrates authentication device 400 that is arranged as a wearable wristband/bracelet. In at least one of the various embodiments, wristband 402 may be arranged to include various hardware components, probes, sensors, and software for capturing authentication (e.g. biometric) and/or physiological signals from its wearer; making a determination whether authentication data was captured from a live person wearing the wearable wristband/bracelet based on a captured physiological feature; communication with a registration application or access point; authentication of a wearer, or the like, as discussed above. Further, in at least one of the various embodiments, wristband 402 may include an adjustable clasp mechanism, such as, clasp 404, for detecting if a wearer removes wristband 402 from his or her wrist. For example, in at least one of the various embodiments, if an authentication device detects that the clasp is opened, it may automatically de-authenticate itself.

FIG. 4B schematically illustrates some of the various components that may be comprised in an authentication device in accordance with at least one of the various embodiments. In at least one of the various embodiments, wristband 402 may include one or more presence sensors, such as, presence sensor 406, presence sensors may be arranged to determine if authentication device 402 is in the presence of a wearer, registration application, access point, or the like, or combination thereof. Also, in at least one of the various embodiments, authentication device 402 may include one or more radios or transceivers, such as, high bandwidth radio 410 and low bandwidth radio 412. These radios may enable an authentication device to communicate with other computer or devices, such as, access points, authentication servers, or the like, or combination thereof.

In at least one of the various embodiments, clasp sensor 408, may be arranged to determine if the clasp, or other securing mechanism, is opened or closed. In at least one of the various embodiments, an opened clasp may indicate that the authentication device may be separated from its authenticated user. Accordingly, for example, the authentication device may be arranged to automatically reset or otherwise de-authenticate itself if clasp sensor 408 indicates that the authentication device is removed from the wearer. Further, removal of the wearable device may be sensed by the wearable authentication device for example, by opening the clasp, cutting the band, or generally severing an electrical conduit such as an electronic continuity detector. One exemplary electronic continuity detector that may be used to detect device removal comprises of a simple circuit within the wearable device that runs around the entire wrist and is broken when the clasp is opened or the band is cut. Other types of device removal detection may be used, for example, including disruption in physiological signal such as skin contact detection by way of conductivity, heat flux, galvanic skin response or motion, or periodic or continuous biometric signal detection. Yet other non-limiting examples of device removal detection embodiments include physiological tests such as pulse detection, skin temperature detection, blood flow detection, pressure detection, electromagnetic field detection, respiration detection, heart rate detection, electrocardiogram detection, photoplethysmogram detection, electromyogram detection, electroencephalogram detection, near infra-red detection, skin-color detection, close magnetic contact detection, and/or non-physiological tests such as mechanical switch detection, ambient temperature detection, ambient light detection, etc.

In at least one of the various embodiments, as discussed above, authentication device 402 may be arranged to communicate with various devices, such as, access points, authentication servers and cloud services, or the like, or combination thereof. In at least one of the various embodiments, high bandwidth radio 410 may include radios for communication using high bandwidth mechanisms such as Wi-Fi, or the like. Low bandwidth radio 412 may represent components for communicating using low-power, shorter range radio systems such as, Bluetooth, Bluetooth Low Energy, NFC, RFID, or the like, or combination thereof. Further, in at least one of the various embodiments, these radios may be coupled to one or more antennas to facilitate the transmission and reception of wireless signals. Any type of antenna(s) may be used including, for example, a dipole antenna, a patch antenna, a helical antenna, an antenna array, trace antenna, and/or others, including combinations of the above.

In at least one of the various embodiments, digital memory 414 may comprise one or more components of non-volatile and/or volatile random access memory (RAM) for storing information for operation of authentication device 402. In at least one of the various embodiments, all or portions of the contents of RAM may be erased if the authentication device is removed of its wearer. Likewise, in at least one of the various embodiments, digital memory 414 may alternatively or additionally comprise read-only memory (ROM), for instance to contain data and/or instructions for the operation of the authentication device. In at least one of the various embodiments, ROM may be "flashable," enabling it to be updated with system updates provided by a registration application or a biometric server service.

In at least one of the various embodiments, digital memory 414 may alternatively or additionally comprise secure memory, which may in some embodiments be a hardened tamper resistant memory device that is resistant to physical tampering. In at least one of the various embodiments, sensitive information such as cryptographic keys, biometric profiles derived from captured biometric features, activity and/or environmental profiles, and the like, may be stored in such secure memory.

In at least one of the various embodiments, authentication device 402 may be arranged to include CPU or System-on-a-Chip (SOC) for controller the operations of the authentication device. The performance capability of CPU/SOC 420 may vary depending on how much processing authentication device 402 is intended to perform.

In at least one of the various embodiments, GPS transceiver 422 may represent the radios, hardware, and instructions (e.g., software) for receiving geo-location. GPS transceiver 422 may determine the physical coordinates of authentication device 402 on the surface of the Earth. GPS transceiver 422 typically outputs a location as latitude and longitude values. However, GPS transceiver 422 may also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of authentication device 402 on the surface of the Earth. It is understood that under different conditions, GPS transceiver 422 may determine a physical location within millimeters for authentication device 402; and in other cases, the determined physical location may be less precise, such as within a meter or significantly greater distances.

In at least one of the various embodiments, additional sensors, such as motion/proximity sensor(s) 424, can be included, as further described below, to support user presence and proximity functions and features for example, in tracking a user presence status (e.g. arriving, present, departing) and automatically recognizing an intended departure to automatically initiate and/or support authorized access termination. These may include one or more sensor systems for acquiring motion-related data including, but not limited to, an accelerometer, motion sensor, step counter, proximity sensor, (near) IR sensor, GPS, gyroscope, capacitive sensors and/or the like, as well as, or otherwise, one or more ranging-related (proximity) sensors as may be amenable to compute or evaluate a wireless device range or proximity based on wireless signal strength, time-of-flight, or the like. Additional sensors may further include, but are not limited to, barometric sensors, pressure sensors, thermometers, microphones, near infrared sensors, light sensors, capacitive sensors, gyroscopes, manometers, cameras, humidity sensors, hall sensors, galvanic skin sensors, photoplethysmogram sensors, electroencephalogram sensors, electromyogram sensors, blood flow sensors, bioimpedance sensors, otoacoustic emission sensors, optical sensors, altimeter sensors, UV light sensors, or the like.

Similarly, in various embodiments, any sensors that may be employed to sense activity, behavioural or environmental parameters and/or profiles, such as those described above, may additionally or alternatively be found on an authentication device 402 as components 416 and 418, respectively.

In at least one of the various embodiments, as discussed above, authentication device 402 may be arranged to include a variety of biometric and/or physiological sensors and probes for detecting, sensing, and/or sampling a variety of biometric and/or physiological signals from the wearer. ECG sensors 426 represent one or more sensors for detecting, sensing, and/or sampling ECG information as described above. Fingerprint sensor 427, depicted adjacent to ECG sensor 426 to indicate a physical proximity on the physical device, represents a sensor for scanning fingerprints, as described above. Likewise, biometric sensors 428 represent one or more sensors for detecting, sensing, and/or sampling other biometric information as described above. In some embodiments, sensors may be comprised of one or more probes, contacts, or the like. In some embodiments, one or more probes or contacts, represented by probes 436, may be used for to collect signals for more than one sensor.

In at least one of the various embodiments, ECG sensor 426 may be adjacent to, surrounding, internal to, integrated with, and/or otherwise close enough to fingerprint sensor 427 that a user may easily place a finger on probes for both sensors at the same time. In another of the various embodiments, probes for ECG sensor 426 may be located next to/integrated with one or more probes for fingerprint sensor 427 such that it is difficult if not impossible to selectively activate one sensor but not the other, and such that it is difficult if not impossible for two fingers, each from different people, to individually be captured by the different sensors.

In one or more of the various embodiments, one or more probes or other components may be shared by two or more sensors. For example, in some embodiments, a sensor for detecting body temperature, heart rate, ECGs, or the like, may be arranged to share the same probe.

In at least one of the various embodiments, biometric sensor 402 may be arranged to include a variety of components for interacting with the wearer. Vibration motor 430 may enable the authentication device to vibrate to notify the wearer of various changes in state, or the like (as discussed above). Likewise, user interface 432 may comprise elements that enable a user to provide input to the authentication device or for receiving output from the authentication device as discussed above, including biometric data that may be employed to uniquely identify a user, such as gait, heart rate, galvanic skin response, temperature, fingerprint, voice or voiceprint, body electrical characteristic, body thermal characteristic, iris pattern, vein pattern, eye vein pattern, facial or other anatomical structure, electrocardiogram, photoplethysmogram, electromyogram, electroencephalogram, transient otoacoustic emissions, phonocardiogram, DNA, one or more chemical markers, one or more biochemical markers, skin-color variation or discolouration, perspiration, or the like. Also, in at least one of the various embodiments, user interface 432 may include a key pad, buttons, LED's microphone (for voice commands), or the like, or combination thereof.

Also, in at least one of the various embodiments, power source 434 may be arranged to provide power of operating authentication device 402. Power source 434 may include various batteries, storage cells, power adapters, chargers, or the like, as well as, power sources such as, photovoltaic, kinetic, or microgenerator, thermal, piezo-electric generator, inductive charging, and wireless power transfer or the like, or combination thereof.

One or ordinary skill in the art will appreciate that authentication device 402 is a non-limiting example of an authentication device that is in accordance at least one of the various embodiments. Even though authentication device 402 represents a wristband wearable authentication device, authentication devices within the scope of these innovation may be arranged in other form factors, such as those discussed above.

Further, in at least one of the various embodiments, some or all of components described in FIG. 4B and/or elsewhere in this paper may be implemented in hardware, including, dedicated (custom) hardware, ASICs, FPGAs, or the like. Likewise, these components or portions thereof may be implemented in whole or in part using software.

Figure 5A:
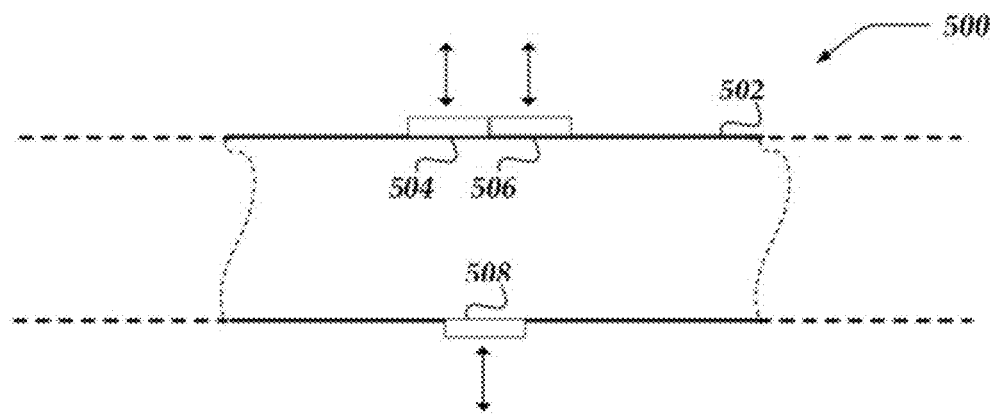
FIG. 5A is a logical schematic diagram of a biometric device showing sensors for fingerprint scanning and electrocardiogram signal capturing in accordance with at least one of the various embodiments.

FIG. 5A illustrates a logical schematic of authentication device 500 showing sensors for fingerprint scanning and ECG signal capturing in accordance with at least one of the various embodiments. In at least one of the various embodiments, authentication device section 502 represents a side cross-section that highlights one arrangement for capturing fingerprints and ECG signals. In at least one of the various embodiments, fingerprint sensors in an authentication device may be arranged to receive signals from one or more probes, such as probe 504. Probe 504 may be a camera, scanner, or other device or component capable of capturing a signal that corresponds to a fingerprint. ECG sensors may be arranged to uses probes, such as probe 506 and probe 508 that may be probe contacts (e.g., electrodes, conductive contacts, or the like) arranged to capture ECG signals upon direct contact of a user's skin. In at least one of the various embodiments, probe 504 and probe 506 are arranged to enable the user to touch with a finger of his or her opposite hand (the hand not wearing the authentication device). In at least one of the various embodiments, probe 508 is arranged to contact the skin of the user's wrist that is wearing the authentication device. Accordingly, a circuit may be made from one hand to the other, enabling ECG signals to be captured through the probes and provided to one or more sensors, concurrent with a fingerprint of the same finger being captured. Note, one of ordinary skill in the art will appreciate that other probes or sensor arrangements may be employed. Further, more or fewer probes or sensors may be arranged in different positions—however, the arrangement disclosed in FIG. 5B is at least sufficient for practicing the innovations described herein.

Figure 5B:
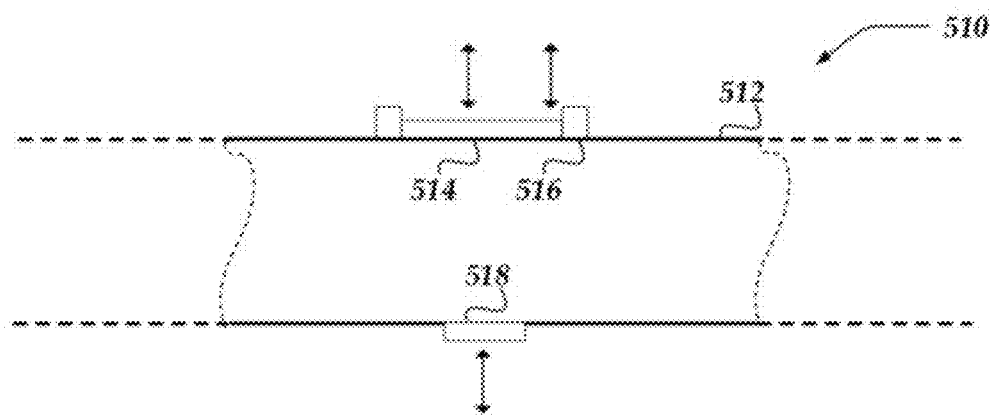
FIG. 5B is a logical schematic diagram of a biometric device showing another arrangement of sensors for fingerprint scanning and electrocardiogram signal capturing in accordance with at least one of the various embodiments.

FIG. 5B illustrates a logical schematic of authentication device 510 showing another arrangement of probes for fingerprint scanning and ECG signal capturing in accordance with at least one of the various embodiments. In at least one of the various embodiments, authentication device section 512 represents a side cross-section that highlights one arrangement for capturing fingerprints and ECG signals. In at least one of the various embodiments, a fingerprint sensor, such as, fingerprint sensor 427, may be arranged to receive signals from one or more probes, such as probe 514 which may be a camera, scanner, or other device capable of capturing an image of a fingerprint. Probe 516 represents a contact (e.g., conductive metal ring or bezel) arranged to capture ECG signals upon direct contact of a user's skin. In some embodiments, probe 516 may be positioned to contact a user's finger while that finger is in contact with probe 514.

In at least one of the various embodiments, because probe 514 and probe 516 are arranged to enable the user to simultaneously contact both probes with the same finger of his or her opposite hand (the hand not wearing the authentication device). Accordingly, while the user's fingertip is in contact with both probes at the same time, probe 514 captures the user's fingerprint information and probe 516 acts as a conductive contact.

In at least one of the various embodiments, probe 518 is arranged to contact the skin of the user's wrist that is wearing the authentication device. Accordingly, a circuit may be made from one hand to the other, enabling ECG signals to be captured through the probes and provided to an ECG sensor, such as, ECG sensor 426, concurrent with a fingerprint of the same finger being captured. Note, one of ordinary skill in the art will appreciate that other sensor arrangements may be employed. Further, more or fewer sensors may be arranged in different positions—however, the arrangement disclosed in FIG. 5B is at least sufficient for practicing the innovations described herein.

Figure 5C:
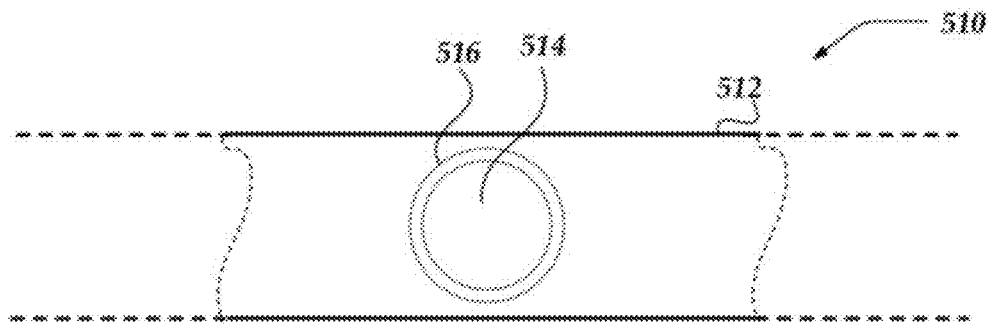
FIG. 5C is a logical schematic diagram of a biometric device showing a top view of the embodiment of FIG. 5B for fingerprint scanning and electrocardiogram signal capturing.

FIG. 5C illustrates a logical schematic of authentication device 510 showing a top view of the arrangement of sensors for fingerprint scanning and ECG signal capturing in accordance with at least one of the various embodiments. In at least one of the various embodiments, authentication device section 512 represents a top view of device 510 that highlights one arrangement for capturing fingerprints and ECG signals. In at least one of the various embodiments, a fingerprint sensor, such as, fingerprint sensor 427, may be arranged to receive signals from one or more probes, such as, probe 514. The one or more probes may include a camera, scanner, or other device capable of capturing an image of a fingerprint. Probe 516 represents a conductive contact (e.g., conductive metal ring or bezel) arranged to capture ECG signals upon direct contact of a user's skin. In some embodiments, probe 516 may be positioned to contact a user's finger while that finger is in contact with probe 514.

In at least one of the various embodiments, because probe 514 and probe 516 are arranged to enable the user to simultaneously contact both probes with the same finger of his or her opposite hand (the hand not wearing the authentication device). Accordingly, while the user's fingertip is in contact with both probes at the same time, probe 514 captures the user's fingerprint information and probe 516 acts as a conductive contact.

In at least one of the various embodiments, probe 518 (not visible in FIG. 5C) is arranged to contact the skin of the user's wrist that is wearing the authentication device. Accordingly, a circuit may be made from one hand to the other, enabling ECG signals to be captured through the probes, concurrent with a fingerprint of the same finger being captured. Note, one of ordinary skill in the art will appreciate that other sensor or probe arrangements may be employed. Further, more or fewer probes or sensors may be arranged in different positions—however, the arrangement disclosed in FIG. 5C is at least sufficient for practicing the innovations described herein.

Again, one or ordinary skill in the art will appreciate that authentication devices 502/512 are non-limiting examples of authentication devices that are in accordance at least some of the various embodiments. Even though authentication devices 502/512 represent wristband wearable authentication devices, authentication devices within the scope of these innovation may be arranged in other form factors, such as those discussed above.

Further, in at least one of the various embodiments, some or all of components described in FIG. 4B and/or elsewhere in this disclosure as it relates to the embodiments shown in FIGS. 5A-5C may also be implemented in hardware, including, dedicated (custom) hardware, ASICs, FPGAs, or the like. Likewise, these components or portions thereof may be implemented in whole or in part using software, firmware and/or combinations thereof.

A general operation and implementation of the herein described embodiments, namely of their various functions, features and processes, are further described in co-pending Canadian Patent Application No. 2,992,333. The person of ordinary skill in the art will appreciate that these and other features and/or functions may be considered herein, without departing from the general scope and nature of the present disclosure.

As noted above, in at least one of the various embodiments, a wearable device may be arranged to omit features and components related to biometric sensors, biometric signals, or the like. In such embodiments, the preauthorization and/or authentication of the device may be based on non-biometric security factors. However, in the interest of brevity, the term biometric device is used throughout this description even though some wearable devices may be arranged to omit biometric features for authentication and/or preauthorization.

It will be understood that each block of flowchart illustrations, and combinations of blocks in flowchart illustrations, may be implemented by computer program instructions. These program instructions may be provided to a processor to produce a machine, such that the instructions, which execute on the processor, create means for implementing the actions specified in a flowchart block or blocks. The computer program instructions may be executed by a processor to cause a series of operational steps to be performed by the processor to produce a computer-implemented process such that the instructions, which execute on the processor to provide steps for implementing the actions specified in a flowchart block or blocks. The computer program instructions may also cause at least some of the operational steps shown in blocks of a flowchart to be performed in parallel. These program instructions may be stored on some type of machine-readable storage media, such as processor readable non-transitive storage media, or the like. Moreover, some of the steps may also be performed across more than one processor, such as might arise in a multi-processor computer system. In addition, one or more blocks or combinations of blocks in a flowchart illustration may also be performed concurrently with other blocks or combinations of blocks, or even in a different sequence than illustrated without departing from the general scope or spirit of the present disclosure.

Accordingly, blocks of a flowchart illustration support combinations of means for performing the specified actions, combinations of steps for performing the specified actions and program instruction means for performing the specified actions. It will also be understood that each block of a flowchart illustration, and combinations of blocks in a flowchart illustration, may be implemented by special purpose hardware-based systems, which perform the specified actions or steps, or combinations of special purpose hardware and computer instructions. The foregoing examples should not be construed as limiting and/or exhaustive, but rather, as illustrative use cases to show implementations of at least one of the various embodiments.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A system for authenticating performance of a designated activity in a designated environment by an authorised user, the system comprising:
   a wireless digital user authentication device (UAD) comprising a wireless transceiver and a digital data processor operable to:
      wirelessly establish an authenticated user access session at an access point within the designated environment for performing and authenticating performance of the designated activity; and
      acquire activity-related data during and corresponding with performance of the designated activity being authenticated in the designated environment;
   a digital application operatively associated with said wireless digital UAD and operable to:
      digitally compare said activity-related data corresponding with performance of the designated activity being authenticated with a digital authenticated activity template representative of corresponding activity data previously acquired and thus anticipated during performance of the designated activity within the designated environment;
      automatically evaluate compliance of said activity-related data corresponding with performance of the designated activity being authenticated with said digital authenticated activity template within a designated tolerance; and
      terminate said authenticated user access session upon non-compliance of said activity-related data corresponding with performance of the designated activity being authenticated with said digital authenticated activity template within said designated tolerance.

2. The system of claim 1, wherein said activity-related data comprises intrinsic behavioural data characteristic of the designated activity within the designated environment, and wherein said digital authenticated activity template comprises a stored behavioural template representative of corresponding intrinsic behavioural data previously acquired and thus anticipated during performance of the designated activity within the designated environment, wherein said authenticated user access session is terminated upon acquired intrinsic behavioural data being inconsistent with said previously acquired data.

3. The system of claim 2, wherein said behavioural data is representative of one or more of a characteristic motion or gesture, physiological signal, posture, or speech pattern of the user during performance of the designated activity within the designated environment.

4. The system of claim 1, wherein said activity-related data comprises environmental data characteristic of the designated environment.

5. The system of claim 4, wherein said environmental data is representative of one or more of a temperature, a pressure, a humidity, an ambient light, or an ambient sound within the designated environment.

6. The system of claim 4, wherein said environmental data is representative of an ambient radio frequency (RF) signature within the designated environment.

7. The system of 1, wherein said digital authenticated activity template is automatically further updated based on further acquisition of said activity-related data during authenticated performance of the designated activity within the designated environment.

8. The system of claim 1, wherein said UAD periodically communicates a positive authentication status to said access point during performance of the designated activity within the designated environment so long as said activity-related data complies with said digital authenticated activity template, and otherwise terminates communication of said positive authentication status to terminate said authenticated user access session upon non-compliance of said activity-related data with said digital authenticated activity template within said designated tolerance.

9. The system of claim 1, wherein said digital authenticated activity template comprises activity-related data that is specific to a user.

10. An automated method for authenticating performance of a designated activity in a designated environment by an authorised user, the method comprising:
   Wirelessly establishing an authenticated user access session via a wireless digital user authentication device (UAD) at an access point within the designated environment for performing and authenticating performance of the designated activity;
   acquiring, via said UAD, activity-related data during and corresponding with performance of the designated activity being authenticated the designated environment; and
   via a digital application operatively associated with said wireless digital UAD:
   digitally comparing said activity-related data corresponding with performance of the designated activity being authenticated with a digital activity template representative of corresponding activity data previously acquired and thus anticipated during performance of the designated activity within the designated environment;

automatically evaluating compliance of said activity-related data corresponding with performance of the designated activity being authenticated with said digital authenticated activity template within a designated tolerance; and terminating said authenticated user access session upon non-compliance of said activity-related data corresponding with performance of the designated activity being activity authenticated with said digital authenticated activity template within said designated tolerance.

11. The method of claim 10, wherein said activity-related data comprises intrinsic behavioural data characteristic of the designated activity within the designated environment, and wherein said digital authenticated activity template comprises a stored behavioural template representative of corresponding intrinsic behavioural data previously acquired and thus anticipated during performance of the designated activity within the designated environment, wherein said authenticated user access session is terminated upon acquired intrinsic behavioural data being inconsistent with said previously acquired data.

12. The method of claim 11, wherein said behavioural data is representative of one or more of a characteristic motion or gesture, physiological signal, posture, or speech pattern of the user during performance of the designated activity within the designated environment.

13. The method of claim 10, wherein said activity-related data comprises environmental data characteristic of the designated environment.

14. The method of claim 13, wherein said environmental data is representative of one or more of a temperature, a pressure, a humidity, an ambient light, or an ambient sound within the designated environment.

15. The method of claim 13, wherein said environmental data is representative of an ambient radio frequency (RF) signature within the designated environment.

16. The method of claim 10, further comprising automatically updating said digital authenticated activity template based on further acquisition of said activity-related data during authenticated performance of the designated activity within the designated environment.

17. The method of claim 16, further comprising periodically updating said digital authenticated activity template while said UAD is inactive.

18. The method of claim 10, further comprising said UAD periodically communicating a positive authentication status to said access point during performance of the designated activity within the designated environment so long as said activity-related data complies with said digital authenticated activity template, and otherwise terminating communication of said positive authentication status to terminate said authenticated user access session upon non-compliance of said activity-related data with said digital authenticated activity template within said designated tolerance.

19. A non-transitory computer-readable medium comprising digital instructions to be implemented by one or more digital processors to authenticate performance of a designated activity in a designated environment by an authorised user by:

Wirelessly establishing an authenticated user access session via a wireless digital user authentication device (UAD) at an access point within the designated environment for performing and authenticating performance of the designated activity;

acquiring, via said UAD, activity-related data during and corresponding with performance of the designated activity being authenticated in the designated environment; and via a digital application operatively associated with said wireless digital UAD:

digitally comparing said activity-related data corresponding with performance of the designated activity being authenticated with a digital authenticated activity template representative of corresponding activity data previously acquired and thus anticipated during performance of the designated activity within the designated environment;

automatically evaluating compliance of said activity-related data corresponding with performance of the designated activity being authenticated with said digital authenticated activity template within a designated tolerance; and terminating said authenticated user access session upon non-compliance of said activity-related data corresponding with performance of the designated activity being authenticated with said digital authenticated activity template within said designated tolerance.

20. The non-transitory computer-readable medium of claim 19, wherein said activity-related data comprises intrinsic behavioural data characteristic of the designated activity within the designated environment, and wherein said digital authenticated activity template comprises a stored behavioural template representative of corresponding intrinsic behavioural data previously acquired and thus anticipated during performance of the designated activity within the designated environment, wherein said authenticated user access session is terminated upon acquired intrinsic behavioural data being inconsistent with said previously acquired data.

21. The non-transitory computer-readable medium of claim 20, wherein said behavioural data is representative of one or more of a characteristic motion or gesture, physiological signal, posture, or speech pattern of the user during performance of the designated activity within the designated environment.

22. The non-transitory computer-readable medium of claim 19, wherein said activity-related data comprises environmental data characteristic of the designated environment.

23. The non-transitory computer-readable medium of claim 22, wherein said ambient RF signature is defined by one or more of a background RF signal, a number of detectable distinct user RF signals, recognisable user RF signal identities, a number of nearby access point RF emitters, recognisable nearby access point RF emitters.

24. The non-transitory computer-readable medium of claim 19, further operable to automatically update said digital authenticated activity template based on further acquisition of said activity-related data during authenticated performance of the designated activity within the designated environment.

25. The non-transitory computer-readable medium of claim 19, further operable to periodically communicate via said UAD a positive authentication status to said access point during performance of the designated activity within the designated environment so long as said activity-related data complies with said digital authenticated activity template, and otherwise terminating communication of said positive authentication status to terminate said authenticated user access session upon non-compliance of said activity-related data with said template within said designated tolerance.

* * * * *

UNITED STATES PATENT AND TRADEMARK OFFICE
CERTIFICATE OF CORRECTION

PATENT NO. : 11,605,255 B2
APPLICATION NO. : 15/931820
DATED : March 14, 2023
INVENTOR(S) : Stuart Keith MacLean et al.

It is certified that error appears in the above-identified patent and that said Letters Patent is hereby corrected as shown below:

In the Specification

Column 22, Line 4, delete "time T" and insert -- time T. --.

Column 40, Line 33, delete "Mobile™" and insert -- Mobile™, --.

In the Claims

Column 58, Line 60, Claim 10, after "authenticated" insert -- in --.

Column 59, Line 12 (approx.), Claim 10, after "being" delete "activity".

Signed and Sealed this
Thirty-first Day of October, 2023

Katherine Kelly Vidal
*Director of the United States Patent and Trademark Office*